US012688142B1

(12) United States Patent
Greenspan et al.

(10) Patent No.: US 12,688,142 B1
(45) Date of Patent: Jul. 21, 2026

(54) SYSTEM AND METHOD OF DATA TUNNELING BETWEEN A SOURCE DEVICE AND A SINK DEVICE

(71) Applicant: NEXT SILICON LTD., Givatayim (IL)

(72) Inventors: Daniel Greenspan, Jerusalem (IL);
Nemanja Kondic, Petrovaradin (RS);
Oren Nishry, Beit Lehem HaGlilit (IL);
Roee Barak, Tel Aviv (IL)

(73) Assignee: NEXT SILICON LTD., Givatayim (IL)

( * ) Notice: Subject to any disclaimer, the term of this patent is extended or adjusted under 35 U.S.C. 154(b) by 0 days.

(21) Appl. No.: 19/343,464

(22) Filed: Sep. 29, 2025

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS

| | | | | |
|---|---|---|---|---|
| 7,581,044 B1 * | 8/2009 | Davis | G06F 13/364 | 710/52 |
| 7,852,757 B1 * | 12/2010 | Puranik | H04L 47/10 | 710/52 |
| 2006/0126612 A1 * | 6/2006 | Sandy | H04L 69/16 | 370/466 |
| 2009/0037616 A1 * | 2/2009 | Brownell | G06F 13/4221 | 710/29 |
| 2022/0407740 A1 * | 12/2022 | Cox | H04L 12/4633 | |

* cited by examiner

*Primary Examiner* — Raymond N Phan
(74) *Attorney, Agent, or Firm* — The Roy Gross Law Firm, LLC; Roy D. Gross

(57) ABSTRACT

A system and method of managing data communication over platform-level interconnect protocols may include receiving first and second requests from a source device, each optionally querying data from a destination device, encapsulating the requests as payload and tunnelling them as respective posted messages via a platform-level interconnect protocol. Embodiments may further include transmitting corresponding non-posted messages, triggered by the posted messages, obtaining queried data pertaining to the first request, and encapsulating the queried data as payload and tunnelling it to a sink device as a completion message associated with the second non-posted message. Embodiments may include a pro forma counter configured to increment upon transmission of each non-posted message and decrement upon reception of each completion message, thereby enabling retrieval of queried data while managing outstanding non-posted message limitations of the platform-level interconnect protocol.

20 Claims, 12 Drawing Sheets

PRIOR
ART

PRIOR
ART

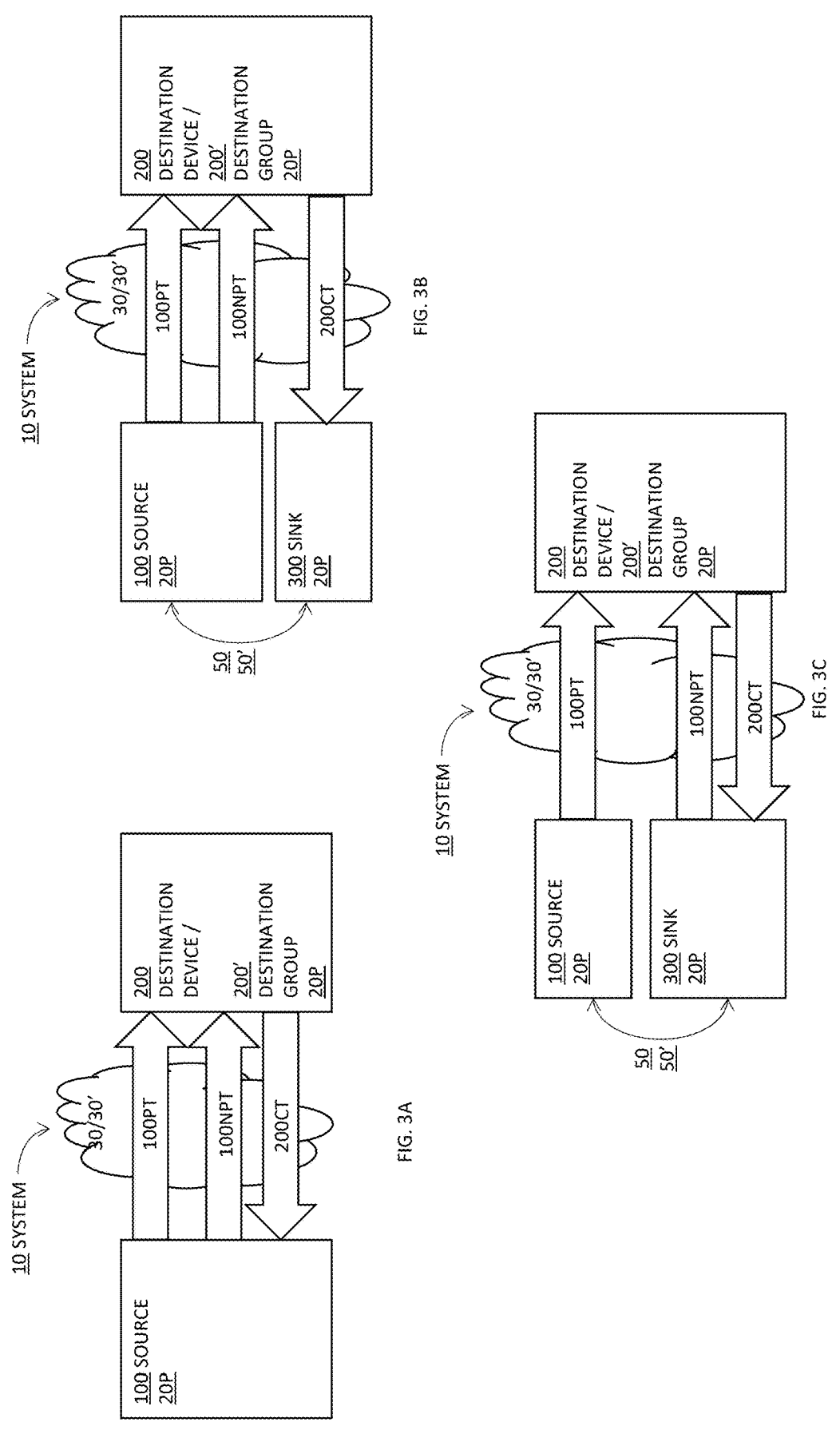

Figure 4:
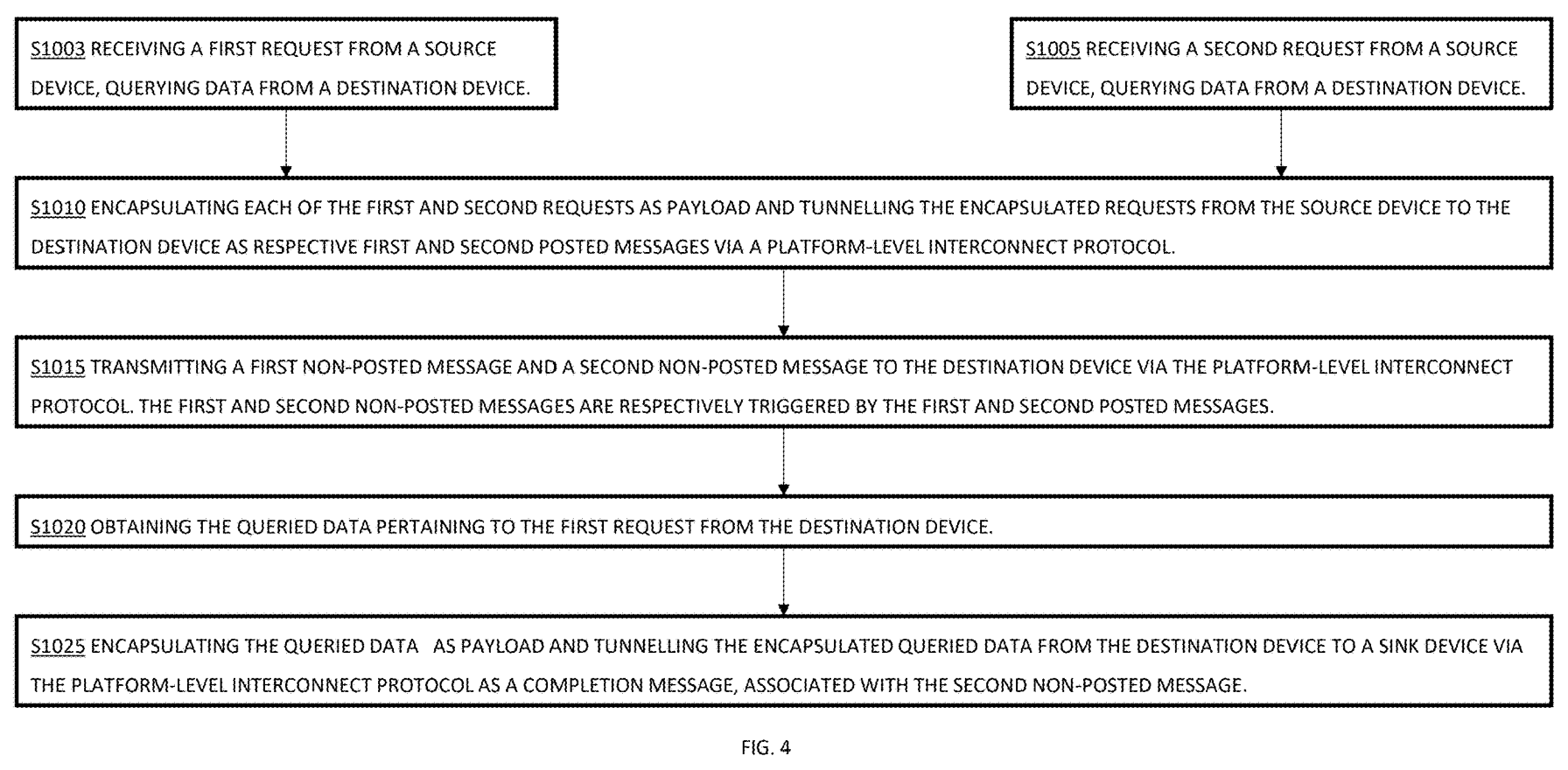

S1005 RECEIVING A SECOND REQUEST FROM A SOURCE DEVICE, QUERYING DATA FROM A DESTINATION DEVICE.

S1003 RECEIVING A FIRST REQUEST FROM A SOURCE DEVICE, QUERYING DATA FROM A DESTINATION DEVICE.

S1010 ENCAPSULATING EACH OF THE FIRST AND SECOND REQUESTS AS PAYLOAD AND TUNNELLING THE ENCAPSULATED REQUESTS FROM THE SOURCE DEVICE TO THE DESTINATION DEVICE AS RESPECTIVE FIRST AND SECOND POSTED MESSAGES VIA A PLATFORM-LEVEL INTERCONNECT PROTOCOL.

S1015 TRANSMITTING A FIRST NON-POSTED MESSAGE AND A SECOND NON-POSTED MESSAGE TO THE DESTINATION DEVICE VIA THE PLATFORM-LEVEL INTERCONNECT PROTOCOL. THE FIRST AND SECOND NON-POSTED MESSAGES ARE RESPECTIVELY TRIGGERED BY THE FIRST AND SECOND POSTED MESSAGES.

S1020 OBTAINING THE QUERIED DATA PERTAINING TO THE FIRST REQUEST FROM THE DESTINATION DEVICE.

S1025 ENCAPSULATING THE QUERIED DATA   AS PAYLOAD AND TUNNELLING THE ENCAPSULATED QUERIED DATA FROM THE DESTINATION DEVICE TO A SINK DEVICE VIA THE PLATFORM-LEVEL INTERCONNECT PROTOCOL AS A COMPLETION MESSAGE, ASSOCIATED WITH THE SECOND NON-POSTED MESSAGE.

SYSTEM AND METHOD OF DATA TUNNELING BETWEEN A SOURCE DEVICE AND A SINK DEVICE

FIELD OF INVENTION

The present invention relates to data communication systems, and more particularly to a system and method for managing data communication over a platform-level interconnect protocol.

BACKGROUND

Platform-level interconnect protocols facilitate communication between components within computing systems. These protocols, such as PCI Express, define standardized methods for data transfer across various modules and devices. As computing systems become more complex, efficient utilization of these interconnects becomes increasingly important.

One technique used to enhance communication efficiency is "data tunneling" (or simply "tunneling"), which may involve encapsulating data from one protocol within another. This approach allows intra-module communication to occur over the platform-level interconnect, potentially improving overall system performance and flexibility, for example by allowing transactions that cannot natively be expressed on the PCIe bus to be transferred over that bus. For example, transactions may be tunneled across PCIe buses using the Vendor Defined Message (VDM) mechanism.

Platform-level interconnect protocols typically support different types of messaging. Posted messaging allows a sender to transmit data without expecting an acknowledgment. In contrast, non-posted messaging requires the sender to wait for a completion message to confirm successful data transfer.

A challenge that may arise in inter-platform communication using these protocols relates to limitations on outstanding non-posted messages. Specifically, there is often a maximum number of non-posted messages that can be in transit without having yet received their corresponding completion messages. When this limit is reached, it can potentially create a bottleneck in data transfer, as new non-posted messages cannot be sent until earlier ones receive their completion messages.

These limitations on outstanding non-posted messages can affect system throughput, particularly in scenarios which use high volumes of non-posted transactions to overcome long system latencies.

Virtual channels may provide a mechanism for logically separating traffic flows within a single physical link. In some aspects, virtual channels can allow multiple independent streams of data to share the same physical resources, potentially improving overall bandwidth utilization and reducing head-of-line blocking. Implementation of virtual channels may, in some cases, offer a way to circumvent limitations associated with non-posted messaging by allowing different types of traffic to be prioritized and managed separately. Likewise, virtual channels can allow posted messages such as VDM messages to be grouped into types and sent using independent resources. However, currently available systems may not always include implementation of virtual channels, which can lead to scenarios where the limitations of non-posted messaging and of shared resources for posted transactions continue to impact system performance and communication efficiency. Systems whose implementation of virtual channels result in a fixed allocation of non-posted message resources to individual virtual channels may result in inferior performance to systems which do not implement virtual channels.

Addressing these challenges may involve developing strategies to optimize the use of both posted and non-posted messaging, as well as finding ways to work within or potentially circumvent the limitations imposed by the interconnect protocols. Such approaches could contribute to improving overall system performance and communication efficiency in complex computing environments without requiring modifications to the specification or implementation of the interconnect protocols themselves.

SUMMARY OF THE INVENTION

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Embodiments of the invention may include a method of managing data communication by at least one processor. According to some embodiments, the at least one processor may be configured to receive a first request and a second request from a source device. Each request may, for example, query data from a destination device.

The at least one processor may encapsulate each of the first and second requests as payload, and tunnel, or transfer the encapsulated requests from the source device to the destination device as respective first and second posted messages via a platform-level interconnect protocol.

The at least one processor may subsequently transmit a first non-posted message and a second non-posted message to the destination device via the platform-level interconnect protocol. The first and second non-posted messages may be respectively triggered by the first and second posted messages.

The at least one processor may obtain the queried data pertaining to the first request from the destination device, encapsulate the queried data as payload, and tunnel the encapsulated queried data from the destination device to a sink device via the platform-level interconnect protocol as a completion message, associated with the second non-posted message. The source device and the sink device may, or may not be implemented as the same device. As explained herein, the at least one processor may thereby enable retrieval of the queried data while managing outstanding non-posted message limitations of the platform-level interconnect protocol.

The platform-level interconnect protocol may, for example, be a Peripheral Component Interconnect Express (PCIe) protocol.

Additionally, or alternatively, the platform-level interconnect protocol may include, for example, a Compute Express Link (CXL) protocol, a Cache Coherent Interconnect for Accelerators (CCIX) protocol, and platform-level derivatives of protocols such as the Coherent Hub Interface (CHI) protocol and the Advanced eXtensible Interface (AXI) protocol.

According to some embodiments, the at least one processor may delay the transmission of at least one non-posted message, pending reception of at least one completion message from the destination device. The at least one processor may thereby avoid exceeding a predetermined number of outstanding non-posted messages between the source device and the destination device.

It may be appreciated that the source and destination devices may interact symmetrically. For example, the destination device may be further configured to function as a source device, adapted to emit encapsulated requests, and the source device may be further configured to function as a destination device, adapted to tunnel encapsulated data via the platform-level interconnect protocol via completion message(s).

Embodiments of the invention may include a system for data tunnelling. Embodiments of the system may include a source device that may include a processor, configured to generate one or more (e.g., a plurality of) requests, addressing a target destination device of a group of destination devices. The source device that may further include an encapsulation module configured to encapsulate each of the requests as payload and a transmission interface.

The transmission interface may be configured to tunnel the encapsulated requests to the target destination device by transmitting a respective plurality of posted messages via a platform-level interconnect protocol, The transmission interface may be further configured to transmit a plurality of non-posted messages to the target destination device via the platform-level interconnect protocol, where each non-posted message may be triggered by, or as a result of a respective posted message of the plurality of posted messages.

Embodiments of the system may further include a sink device that may include a reception interface. The reception interface may be configured to receive encapsulated retrieved data from the target destination device via the platform-level interconnect protocol as a completion message. This encapsulated retrieved data may pertain to (e.g., contain a response for) a specific request of the plurality of requests, however, the completion message may be associated with any one of the plurality of non-posted messages. In other words, a response for a first request that was transferred to the destination device over a first posted message, may be included in a completion message that is associated with a non-posted message which, in turn, was triggered by a second, possibly unrelated posted message.

According to some embodiments, the reception interface of said sink device may be further configured to identify encapsulated retrieved data, of a completion message originating from a first request, as a response of the target destination device to at least one second request. Pertaining to the same example, the reception interface may determine that the response to the first request (in the first posted message) is located at the completion message that was received in response to the second non-posted message, that was, in turn, triggered by the second posted message. Embodiments of the invention may thereby overcome restrictions of platform-level interconnect protocols, such as limitations on outstanding non-posted messages.

Additionally, or alternatively, the processor of the source device may be further configured to delay transmission of at least one non-posted message, pending reception of at least one completion message from the target destination device. The processor of the source device may thereby avoid exceeding a predetermined number of outstanding non-posted messages between the source device and the target destination device.

Embodiments of the invention may further include at least one pro forma counter configured to (a) increment upon transmission of at least one (e.g., each) non-posted message (e.g., from the source device), and (b) decrement upon reception of at least one (e.g., each) completion message (e.g., at the sink device).

Additionally, or alternatively, the processor of the source device may be further configured to compare the at least one pro forma counter against a predetermined limit, and control the transmission interface to transmit the non-posted message based on said comparison. The source device may thereby refrain from surpassing protocol-imposed limits on outstanding non-posted messages.

Additionally, or alternatively, the source device may be further configured to generate at least one access request that addresses the target destination device, but does not query data from the target destination device. The source device may encapsulate the at least one access request as payload, and tunnel the encapsulated access request to the target destination device in a respective posted message via the platform-level interconnect protocol, as explained herein in relation to requests that do query data from the target destination device. In such embodiments, the source device may refrain from triggering a corresponding non-posted message to the destination device via the platform-level interconnect protocol, and may control the at least one pro forma counter to refrain from incrementing.

Embodiments of the invention may be further configured to support third-party requests. For example, the source device may be configured to receive at least one third-party request that addresses the target destination device, and analyze the third-party request, to determine whether a response may be required from the target destination device. The source device may encapsulate the at least one third party request as payload, and transmit, or tunnel the encapsulated at least one third party request to the target destination device in a respective posted message via the platform-level interconnect protocol. Based on the analysis, the source device may refrain from triggering a corresponding non-posted message to the destination device via the platform-level interconnect protocol. Additionally, or alternatively, the source device may control the at least one pro forma counter based on said analysis, to refrain from incrementing.

According to some embodiments, one or more (e.g., each) posted messages may include an identification of the sink device as a recipient, and the target destination device may be configured to address the completion message to the sink device, via the platform-level interconnect protocol, based on that identification.

In some embodiments, the at least one pro forma counter may be implemented on the sink device. The source device may be configured to notify the sink device of transmission of at least one non-posted message, and the sink device may be configured to increment the at least one pro forma counter based on that notification.

According to some embodiments, the at least one pro forma counter may include a global pro forma counter, tracking an overall number of outstanding non-posted messages, sent to the group of destination devices. Additionally, or alternatively, the at least one pro forma counter may include one or more dedicated pro forma counters, each tracking a number of outstanding non-posted messages, sent to a specific destination device of the group of destination devices.

According to some embodiments, source device may collaborate with the recipient sink: In such embodiments, the source device may be configured to identify the recipient sink device for each posted message, and collaborate with the recipient sink device to maintain an independent count of outstanding non-posted messages.

According to some embodiments, the source device may be configured to transmit the posted, and non-posted messages to a plurality of target destination devices of the group of destination devices via at least one connection fabric device.

Additionally, or alternatively, the source device may be configured to identify a condition where the independent count pertaining to a first destination device has exceeded a predetermined threshold, and redirect a request from the first destination device to a second destination device of the group of destination devices, based on that identification, to overcome this condition.

Embodiments of the invention may include a destination device for managing data communication. According to some embodiments, the destination device may include a reception interface configured to receive encapsulated first and second requests as payload from a source device via respective first and second posted messages transmitted through the platform-level interconnect protocol, and receive a first non-posted message and a second non-posted message from the source device via a platform-level interconnect protocol. The first and second non-posted messages may be respectively triggered by the first and second posted messages.

In such embodiments, the destination device may further include an extraction module configured to extract the first request, a processor adapted to generate a response based on the extracted first request, and a transmission interface module, configured to tunnel the response to a sink device via the platform-level interconnect protocol in a completion message associated with the second non-posted messages.

The sink device may be configured to identify the response, in the completion message associated with the second non-posted message as pertaining to the first data request.

According to some embodiments, the first request may include a query of data from the destination device. In such embodiments, the processor may be configured to obtain queried data based on the first data request, and encapsulate the queried data as payload, to be sent via a completion message associated with either one of the first and second non-posted messages.

BRIEF DESCRIPTION OF FIGURES

FIG. 3A is a block diagram illustrating an example of a system for managing data communication according to some embodiments of the invention;

FIGS. 3B and 3C are block diagrams illustrating additional examples of a system for managing data communication, according to some embodiments of the invention;

FIG. 4 illustrates a flowchart of a method for managing data communication, according to some embodiments of the invention;

FIG. 6 is a schematic diagram showing a simulation of function of a data communication system, according to some embodiments of the invention;

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
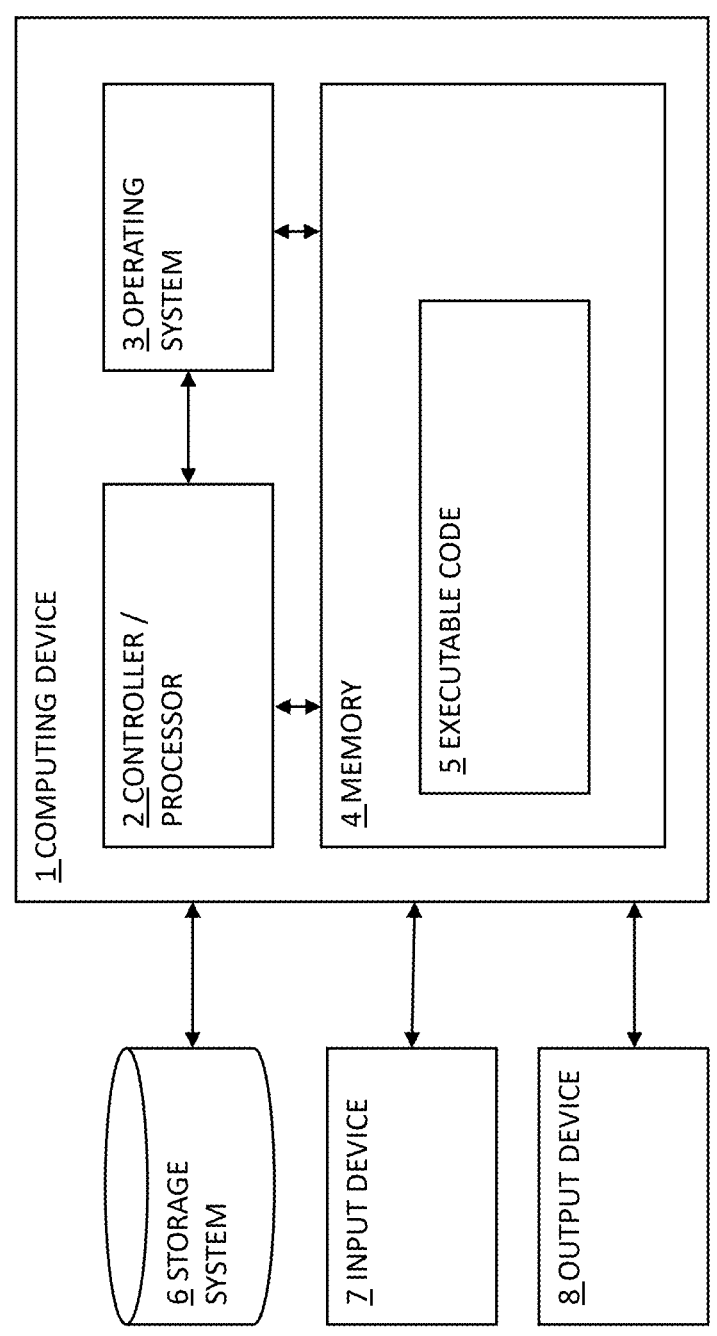
FIG. 1 is a block diagram, depicting a computing device which may be included in a system for managing data communication over a platform-level interconnect protocol according to some embodiments.

Reference is now made to FIG. 1, which is a block diagram depicting a computing device, which may be included within an embodiment of a system for managing data communication over platform-level interconnect protocols, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8. Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SDRAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc.

may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may manage data communication as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Data pertaining to managing communication among one or more computing entities may be stored in storage system 6 and may be loaded from storage system 6 into memory 4 where it may be processed by processor or controller 2. In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8. For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8.

A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

Figure 2B:
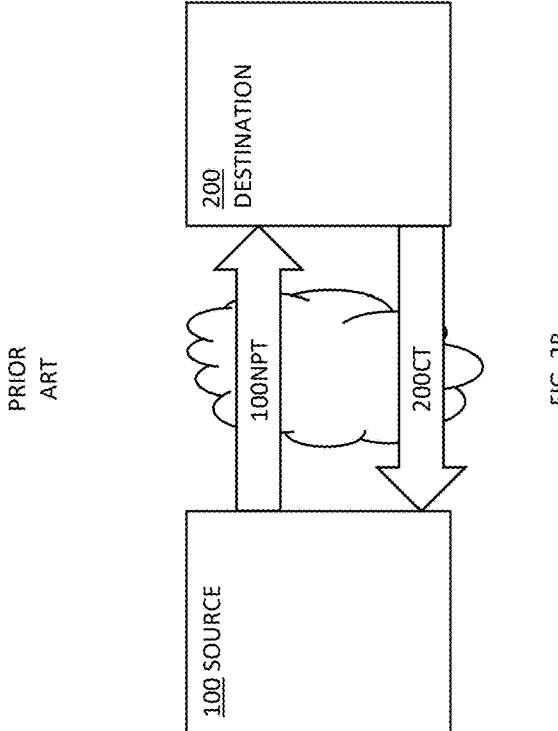
FIG. 2B is another block diagram depicting data transaction over a communication channel, as known in the art.
Figure 2A:
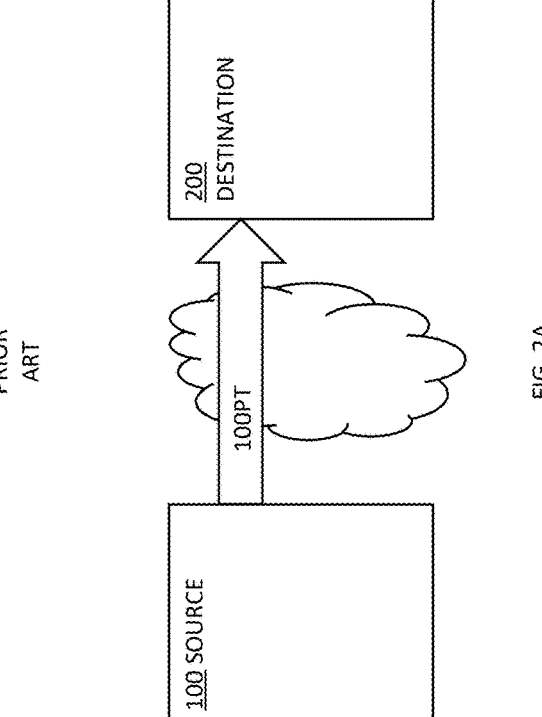
FIG. 2A is a block diagram depicting a data transaction over a communication channel, as known in the art.

Reference is now made to FIG. 2A and FIG. 2B, which illustrate examples of data transfer scenarios known in the art. These figures depict communication channels implementing an inter-platform protocol between devices.

As used herein, the term "platform-level interconnect protocol" may refer to a standardized communication protocol designed for high-speed data transfer between separate hardware components or modules within a computing system. Such protocols may facilitate communication between distinct devices, chips, or circuit boards, and may include features for managing data flow, error handling, and resource allocation across the system.

Platform-level interconnect protocols used for data transfer scenarios discussed herein may include, for example PCIe (Peripheral Component Interconnect Express). In other cases, the platform-level interconnect protocol may be selected from a group including CXL (Compute Express Link), CCIX (Cache Coherent Interconnect for Accelerators), platform-level derivatives of CHI (Coherent Hub Interface), or platform-level derivatives of AXI (Advanced eXtensible Interface) applied.

FIG. 2A shows a simplified block diagram of a first example of data transaction over a communication channel. In this scenario, a source device 100 connects to a destination device 200 through a posted message 100PT. Posted message 100PT may enable transmission of data from the source device 100 to the destination device 200, and may typically not require a response. Device 200 may limit the sending of transactions from device 100 by back-pressure mechanisms such as link credits.

FIG. 2B illustrates another example of data transaction over a communication channel implementing an inter-platform protocol. In this scenario, a source device 100 and a destination device 200 are configured to communicate using a non-posted message 100NPT. The non-posted message 100NPT enables transmission of non-posted transactions, e.g., transactions that may require a response, from the source device 100 to the destination device 200. Additionally, a completion message 200CT may allow completion transactions to flow from the destination device 200 back to the source device 100, e.g., to provide the required response. Non-posted transactions and completion messages may each have associated back-pressure mechanisms.

The communication channels depicted in FIG. 2A and FIG. 2B represent different types of data transfer mechanisms supported by these platform-level interconnect protocols. The posted message 100PT in FIG. 2A allows for one-way payload communication from the source device 100 to the destination device 200. In contrast, the combination of non-posted message 100NPT and completion message 200CT in FIG. 2B enables a request-response type of communication between the source device 100 and the destination device 200.

Reference is now made to FIGS. 3A, 3B, 3C, which are simplified block diagrams, illustrating examples of implementation of system 10 for managing data transfer over a platform-level interconnect protocol 30, according to some embodiments of the invention. The examples of FIGS. 3A, 3B, 3C depict data transfer scenarios that may be addressed by embodiments of the invention, to overcome restrictions of platform-level interconnect protocols 30, such as limitations on outstanding non-posted messages.

FIG. 3A depicts a simplified block diagram illustrating an example for implementation of a communication system 10, according to some embodiments of the invention. In the example of FIG. 3A, system 10 may include a source device 100 and a destination device 200.

Devices 100/200 may, for example, be implemented as discrete devices such as separate Integrated Circuit (IC) chips. In such embodiments, one or more (e.g., each) device 100/200 may employ an internal bus protocol 20P, allowing inter-chip communication. Such internal bus protocols 20P may include, for example, the commercially available Next-generation Fabric Interface (NFI) protocol, or Coherent Host Interface (CHI) protocol for on-chip communication.

As shown in FIG. 3A, source device 100 and destination device 200 may be connected via a communication media (e.g., wired or wireless communication media), to implement a platform-level communication protocol 30. As explained herein, devices 100/200 may encapsulate internal bus protocol 20P data and/or metadata, in the platform-level communication protocol 30 format, thereby allowing tunneling of inter-chip data over platform-level communication 30.

The platform-level communication protocol 30 may support a plurality of physical or logical communication channels. For example, source device 100 may connect to destination device 200 via two transaction channels. A posted message channel 100PT may provide one communication path from the source device 100 to the destination device 200. A non-posted message path 100NPT may provide another communication path from the source device 100 to the destination device 200. As explained herein, source device 100 may maintain a count of outstanding non-posted messages.

Destination device 200 may connect back to the source device 100 through a completion message path or channel 200CT. This path may enable the destination device 200 to transmit responses, such as task completion transactions back to source device 100.

In the example of FIG. 3B, system 10 may include a source device 100, a destination device 200, and/or a sink device 300. Device 300 may be implemented, for example, as a discrete device such as separate IC chips, and may employ an internal bus protocol 20P as explained above. It may be appreciated that the internal bus protocol 20P of devices 100/200/300 may, or may not be the same internal bus protocol 20P.

The requests and responses transmitted between devices 100/200/300 may include metadata such as fine-grained traffic priority information, timestamps, packet identifiers, and the like, to enhance the functionality and flexibility of communication system 10 via the platform-level interconnect protocol 30, as elaborated herein.

In the example of FIG. 3B, source device 100 may connect to at least one destination device 200 through two channels, implemented by the platform-level interconnect protocol 30: A posted message channel 100PT may carry posted transactions from the source device 100 to the destination device 200. A non-posted message channel 100NPT may enable transmission of non-posted transactions from the source device 100 to the destination device 200. Destination device 200 may connect to sink device 300 through a completion message channel 200CT. This channel may allow completion transactions to flow from the destination device 200 to the sink device 300. These channels (100PT, 100NPT, 200CT) may, for example, be implemented as physical channels such as discrete wire connections, or as logical channels, differentiated by link-level multiplexing.

In the scenario of FIG. 3B, source device 100 may transmit a posted message 100PT to a destination device 200 of a group of one or more destination devices 200'. Posted message 100PT may, for example, include a data request or query, targeting destination device 200. Source device 100 may follow-up the posted message 100PT with (a) a non-posted message 100NPT, targeting the same destination device 200, and (b) a notification 50 of the data request, directed to a specific sink device 300. Source device 100 may select the specific sink device 300 as a recipient that may process and utilize a response from destination device 200. This configuration may allow source device 100 to coordinate the flow of requests and responses across multiple devices.

The non-posted message 100NPT may include identification information specifying sink device 300 as the intended recipient for the response. Based on this identification, destination device 200 may direct response 200RES for the request 200REQ (e.g., see FIGS. 5A-5C and 8A-8C) to the designated sink device 300 via completion message 200CT, rather than returning the response to the originating source device 100.

According to some embodiments, notification message 50 may include identification information for the specific request 200REQ, such as a transaction ID, sequence number, or unique identifier. This identification enables sink device 300 to correlate incoming response 200RES with the original request 200REQ when the completion message 200CT is received from destination device 200. By matching the response 200RES with the corresponding request 200REQ based on the information provided in notification message 50, sink device 300 can accurately associate the retrieved data with its intended purpose and perform appropriate further processing. This matching mechanism ensures that even when responses are received out of order or through the decoupled completion message system, sink device 300 maintains the correct correspondence between requests and their associated responses.

Additionally, or alternatively, destination device 200 may include partial details of the posted request 100PT in completion message 200CT, thereby avoiding the need for such a matching mechanism.

As explained herein, source device 100 may maintain a count of outstanding non-posted messages. Sink device 300 may send a notification 50' to the originator source device 100, indicating (i) reception of completion message 200CT and/or (ii) handling of response 200RES, allowing the source device 100 to decrement its count of outstanding non-posted messages.

In some embodiments, source device 100 and sink device 300 may be implemented as the same device, for example as shown in FIG. 3A where source device 100 is a combined source and sink device. This configuration may allow for efficient handling of both outgoing requests and incoming responses within a single device. Additionally, or alternatively, source device 100 and sink device 300 may be implemented as separate entities or devices. In such embodiments, source device 100 may provide destination device 200 with an identification of sink device 300 (e.g., included in posted message 100PT) as a recipient for completion message 200CT.

FIG. 3C depicts an example for another embodiment of the invention. In this example, source device 100, destination device 200 and sink device 300 may be implemented as different devices, e.g., different IC devices, interconnected via infrastructure (e.g., a communication bus or fabric) of the platform-level interconnect protocol 30.

As shown in FIG. 3C, source device 100 may transmit posted message 100PT to a target destination device 200 of a group of destination devices 200', and send notification 50 to the selected sink device 300, but refrain from sending the non-posted message 100NPT itself. Instead, upon receiving notification 50, sink device 300 may transmit the non-posted message 100NPT to destination device 200 via the platform-level interconnect protocol 30. This approach may allow sink device 300 to control the timing and flow of non-posted messages 100NPT based on its own resource availability and processing capacity. Target destination device 200 may then send completion message 200CT to sink device 300, completing the communication cycle. This embodiment may provide enhanced flexibility in managing outstanding non-posted message limitations by distributing the responsibility for non-posted message 100NPT transmission across multiple sink devices 300 in system 10.

The communication channels (100PT, 100NPT, 200CT) may be arranged to facilitate different types of data transfer between the devices. For example, posted message 100PT and non-posted message 100NPT channels may provide paths for different types of transactions from source device 100 to destination device(s) 200, while completion message 200CT channel may enable responses to flow from the destination device 200 back to the sink device 300.

Additionally, or alternatively, source device(s) 100, destination device(s) 200 and/or sink device(s) 300 may be connected via a connection fabric device, such as a PCIe switch module, allowing flexible routing of messages within system 10.

This configuration may enable source device 100 to transmit posted messages 100PT and non-posted messages 100NPT to one or more (e.g., a plurality of) target destination devices 200 of the group 200' of destination devices via the platform-level interconnect protocol 30. Additionally, or alternatively, this configuration may enable tunneling of non-posted messages 100NPT and/or completion messages 200CT between sink devices 300 and target destination devices 200 of the group 200' of destination devices via the platform-level interconnect protocol 30.

In this context, transmission "via" or "over" the platform-level interconnect protocol 30 (e.g., PCIe) may refer to the encapsulation and transmission of data according to the rules and specifications of that protocol. For example, the connection fabric device 30' (e.g., a PCIe switch 30') may facilitate routing and management of these protocol-compliant messages (e.g., posted messages 100PT, non-posted messages 100NPT, completion messages 200CT) between multiple devices (e.g., 100/200/300). As may be appreciated by a person skilled in the art, such a switch 30' may provide multiple ports, allowing to connect source device(s) 100 to several destination devices 200 and or sink devices 300 simultaneously, and directing messages to the appropriate targets based on addressing information within the messages.

Building upon the example of PCIe as the platform-level interconnect protocol 30, system 10 may be implemented to support virtualization of PCIe channels, enhancing flexibility and resource utilization. In this configuration, a connection fabric device (e.g., PCIe switch) 30' may implement Single Root I/O Virtualization (SR-IOV) or Multi-Root I/O Virtualization (MR-IOV) technologies. These virtualization techniques may allow a single physical PCIe device to appear as multiple virtual devices, each with its own dedicated resources.

For example, a source device 100 may create multiple virtual resources, each representing a virtual PCIe endpoint. These virtual resources may be assigned to different destination devices 200 or sink devices 300, allowing them to share the physical PCIe link while maintaining isolation and quality of service. PCIe switch 30' may then manage the routing of messages between these virtual endpoints, by mapping virtual addresses to physical addresses.

Additionally, or alternatively, system 10 may utilize virtual channels to support transmission and prioritization of different data types based on their requirements. For instance, streaming video data may be assigned to a higher priority virtual channel to ensure low latency and consistent bandwidth, while bulk data transfers or background processing tasks may be routed through lower priority virtual channels. This prioritization mechanism allows system 10 to maintain quality of service for time-sensitive applications while efficiently utilizing available bandwidth for less critical operations.

It may be appreciated that roles of source device 100, destination device 200 and/or sink device 300 may change according to communication dynamics. Nevertheless, the present description will retain the notifications of each of these devices, to avoid confusion.

For example, a device currently functioning as a destination device 200 may, in some embodiments, function as a source device 100, to emit or direct data requests to other devices. Similarly, a device currently functioning as a source device 100 may be configured to function as a destination device 200, adapted to tunnel encapsulated data via the platform-level interconnect protocol 30 in a completion message. This bidirectional functionality may enhance the versatility of system 10. Moreover, devices may take on multiple roles simultaneously. For example, destination device 200 may, in some embodiments, simultaneously function as a source device 100, and source device 100 may simultaneously function as destination device 200.

Reference is now made to FIG. 4 which is a flow diagram illustrating a flowchart of a method for managing data communication by at least one processor in system 10.

As explained herein, embodiments of the invention may utilize non-posted messages 100NPT and their corresponding completion messages 200CT as a flexible messaging pool. This approach may be designed to overcome limitations of the platform-level interconnect protocol 30, such as restrictions on outstanding non-posted messages.

Embodiments of the invention may decouple the association between requests and responses. For example, a first response, included in a completion message 200CT may not necessarily correspond to the non-posted message 100NPT that was triggered by posted message 100PT. Instead, this response may actually pertain to a different request that arrived at the destination device 200 via a separate posted message 100PT.

This decoupling mechanism may facilitate efficient utilization of available completion channels. In other words, by treating completion messages associated with non-posted messages as a pool of available communication resources, embodiments of the invention may dynamically match responses to requests with completions to hold those responses based on completion availability rather than any strict one-to-one correspondence. This approach may mitigate bottlenecks caused by limitations in the platform-level interconnect protocol 30, to improve overall system throughput and responsiveness.

As shown in steps S1003 and S1005, system 10 may receive a first request and a second request from the source device 100. Each such request may require a response (e.g., query data) from destination device 200. It may be appreciated that S1003 and S1005 may occur in any chronological order. In other words, step S1003 may precede, follow, or be concurrent with step S1005.

As shown in step S1010, system 10 may encapsulate each of the first and second requests as payload. System 10 may then tunnel the encapsulated requests from the source device 100 to the destination device 200 as respective first and second transmissions of posted messages 100PT via a platform-level interconnect protocol 30.

As used herein, the term "tunneling" may refer to a technique of encapsulating data from one protocol within another protocol for transmission across a network or communication channel. In the context of this invention, tunneling may involve packaging intra-module protocol data within platform-level interconnect protocol 30 messages, allowing the intra-module communication to occur over the platform-level interconnect.

As shown in step S1015, system 10 may transmit a first non-posted message 100NPT and a second non-posted message 100NPT to the destination device 200 via the platform-level interconnect protocol 30. The first non-posted message 100NPT may be triggered by (and thus "associated with") the first posted message 100PT transmission. Similarly, the second non-posted message 100NPT may follow, or be triggered by the second posted message 100PT transmission. In cases where the appropriate recipient of the response is different from source device 100, (e.g., sink device 300), the non-posted messages 100NPT may be such as to warrant receipt of a completion at sink device 300, for example, by source device 100 sending a non-posted message 100NPT on behalf of sink device 300.

In steps S1020 and S1025, system 10 (e.g., destination device 200 of system 10) may obtain or calculate a response to the queried data pertaining to the first request. Destination device 200 may subsequently encapsulate the queried data as payload, and tunnel the encapsulated queried data to an appropriate recipient (e.g., sink device 300 and/or source device 100) via the platform-level interconnect protocol 30 as a completion message 200CT that may be associated with any one of the non-posted messages 100NPT. In summary:

(1) On the source 100 side, (a) the first request 200REQ may be conveyed over the first posted message 100PT to destination device 200; (b) the first posted message 100PT may trigger a first non-posted message 100NPT; and (c) a second posted message 100PT (e.g., representing a second request 200REQ) may trigger a second non-posted message 100NPT.

(2) On the destination device 200, a completion message 200CT that contains a response 200RES (e.g., the queried data) for the first request 200REQ (as conveyed over the first posted message 100PT) may be transmitted to the sink device 300 following, or in association with the second non-posted message 100NPT. Destination device 200 may thus disassociate response 200RES from the first posted message 100PT that conveyed the first request 200REQ.

(3) On the sink device 300 (which may, or may not be the same as source device 100), at least one processor may re-associate the first request 200REQ that was sent over the first posted message 100PT (possibly by a different, source device 100 on behalf of sink 300) with response 200RES, received via completion message 200CT.

It may be appreciated that this association between the completion message 200CT and any one of the requests 20 in posted messages 100PT facilitates flexible and efficient management of outstanding non-posted message limitations imposed by the platform-level interconnect protocol 30.

By decoupling the strict one-to-one correspondence between requests and responses, the system can utilize the available non-posted message 100NPT slots more dynamically. This approach allows the destination device to send responses as completion messages 200CT associated with any available non-posted message, rather than waiting for a specific non-posted message to become available. Consequently, system 10 may maintain a higher throughput of data communication while staying within the protocol-imposed limits on outstanding non-posted messages.

This mechanism effectively creates a pool of non-posted messages and completion messages that can be utilized as needed, reducing potential bottlenecks and improving overall system performance without violating the constraints of the platform-level interconnect protocol 30.

Embodiments of the invention may thereby enable retrieval of the responses (e.g., the queried data) while managing, or mitigating outstanding non-posted message limitations of the platform-level interconnect protocol.

Additionally, or alternatively, embodiments of the invention may include delaying the transmission of at least one non-posted message 100NPT. This delay may occur pending reception of at least one completion message 200CT from the destination device 200. By implementing this delay, embodiments of the invention may avoid exceeding a predetermined number of outstanding non-posted messages 100NPT between source device 100 and the destination device 200.

Figure 5A:
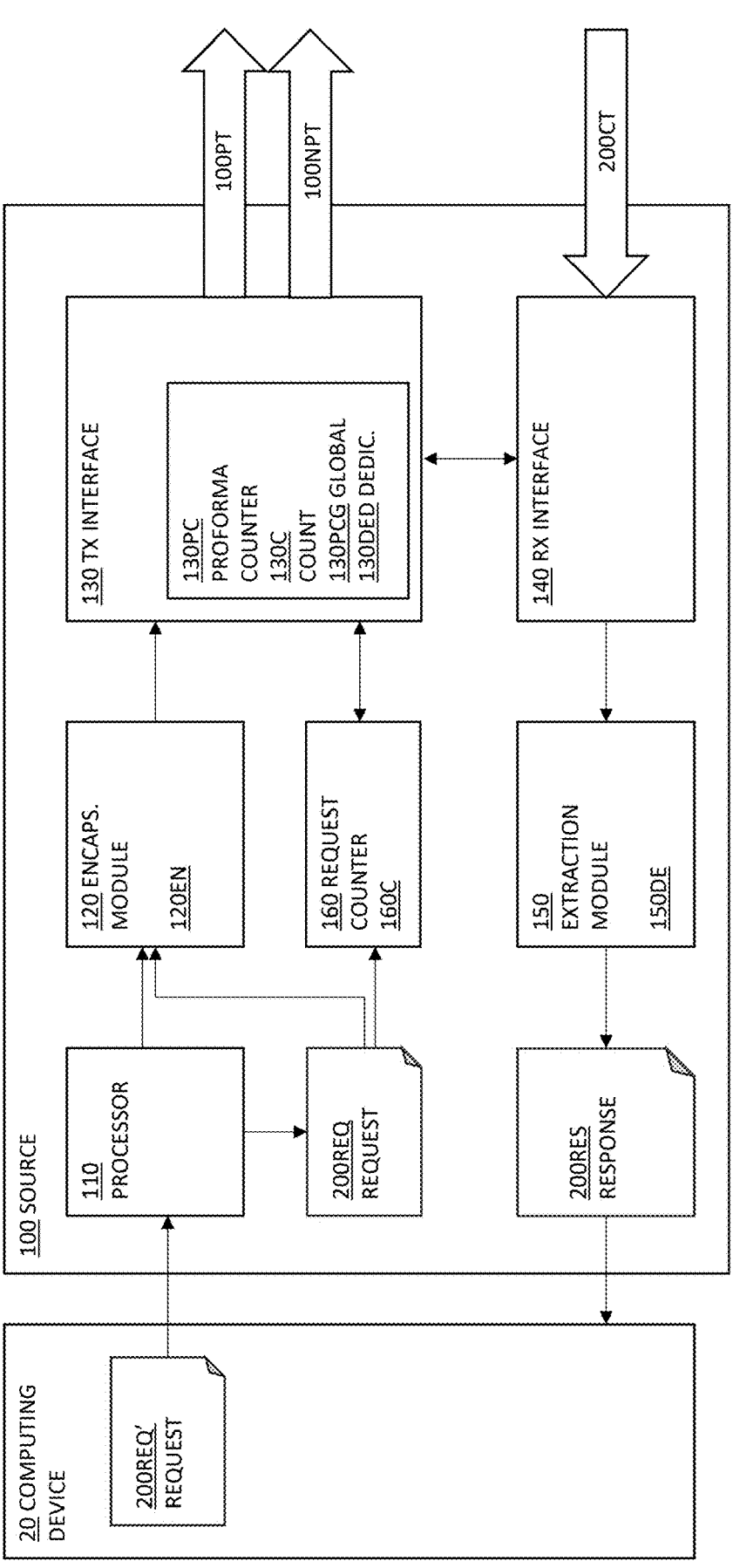
FIG. 5A illustrates a block diagram of a source device that may be included in a data communication system, according to some embodiments of the invention.

Reference is now made to FIG. 5A which is a block diagram depicting an example for implementation of at least part of the system 10 for managing data communication. As shown in FIG. 5A, system 10 may include a source device 100 that may be the same as source device 100 of FIGS. 3A-3C.

The functionality of source device 100 depicted in FIG. 5A may correspond to a work scenario as illustrated in FIG. 3A. In this scenario, source device 100 may communicate data requests 200REQ to a destination device 200 using two types of messages supported by the platform-level interconnect protocol 30: posted messages 100PT and non-posted messages 100NPT. The posted messages 100PT may carry encapsulated data requests, while the non-posted messages 100NPT may serve as triggers for receiving responses from destination device 200 in the form of completion messages 200CT.

Source device 100 may include a processor module 110, which may be the same as processor 2 of FIG. 1. Processor module 110 may be configured to generate one or more (e.g., a plurality of) requests 200REQ, addressing a target destination device 200 of at least one (e.g., a group of) destination devices 200.

For example, processor module 110 may be configured to execute a software application or process, that may include a plurality of computing code instructions (e.g., executable code 5 of FIG. 1). As part of executing these computing code instructions 5, processor module 110 may generate requests 200REQ such as requests for querying data from one or more other computing modules or entities, including destination device(s) 200. In other words, computing code instructions 5 may require obtaining a response 200RES from one or more destination devices 200.

Additionally, or alternatively, the system 10 may include, or may be communicatively connected to at least one computing device 20. Computing device 20 may present, or provide at least one data request 200REQ to be processed by source device 100, for retrieving one or more data elements (e.g., response 200RES) from specified destination device(s) 200.

Source device 100 may include an encapsulation module 120, configured to encapsulate one or more (e.g., each) of requests 200REQ as payload. In other words, encapsulation module 120 may produce encapsulated data 120EN based on request 200REQ, to be transmitted via the platform-level interconnect protocol 30.

Transmission interface 130 may be configured to tunnel the plurality of encapsulated requests 200REQ to the target destination device by transmitting a respective plurality of posted messages 100PT via the platform-level interconnect protocol 30.

Transmission interface 130 may be further configured to transmit a plurality of non-posted messages 100NPT to the target destination device 200 via the platform-level interconnect protocol 30. Each non-posted message 100NPT may be associated with a respective posted message 100PT of the plurality of posted messages 100PT, in a sense that one or more (e.g., each) posted message 100PT may automatically trigger transmission of an associated non-posted message 100NPT.

Transmission interface 130 may include components for tracking outgoing and/or incoming transactions. For example, the transmission interface 130 may include at least one pro forma counter 130PC. The at least one pro forma counter 130PC may be configured to increment upon transmission of each non-posted message 100NPT, and decrement upon reception of each completion message 200CT.

The at least one pro forma counter 130PC may be, for example, a global pro forma counter 130PCG configured to track an overall number (e.g., maintain a count) 130C of outstanding non-posted messages 100NPT sent to the group of destination devices 200. In other words, source device 100 may increment global pro forma counter 130PCG upon transmission of at least one (e.g., each) non-posted message 100NPT, and decrement global pro forma counter 130PCG upon reception of each completion message from the group of destination devices 200.

Additionally, or alternatively, the at least one pro forma counter 130PC may be, or may include one or more dedicated pro forma counters 130DED. The term "dedicated" may be used in this context to indicate their dedication to specific destination devices 200. In other words, each dedicated pro forma counter 130DED may be appointed to maintain a unique count 130C of outstanding non-posted messages 100NPT sent to their respective, specific destination device(s) 200 of the group of destination devices. In other words, source device 100 may increment dedicated pro forma counter 130DED upon transmission of at least one (e.g., each) non-posted message 100NPT to a specifically dedicated destination device 200, and decrement dedicated pro forma counter 130DED upon reception of each completion message from that dedicated destination device 200.

In some embodiments, processor module 110 may be configured to compare a count 130C of at least one pro forma counter 130PC against a predetermined limit, and control the transmission interface 130 to transmit the non-posted message 100NPT based on that comparison.

Additionally, or alternatively, processor module 110 may be further configured to delay transmission of at least one non-posted message 100NPT, pending reception of at least one completion message 200CT from the target destination device 200, thereby avoiding exceeding of a predetermined number of outstanding non-posted messages 100NPT between the source device 100 and the target destination device 200.

For example, the predetermined limit may be set based on system requirements or hardware constraints. For example, the limit may be set to 32 outstanding non-posted messages for a PCIe Gen 3 implementation, or 64 for a PCIe Gen 4 system. Processor module 110 may increment the pro forma counter 130PC each time a non-posted message 100NPT is sent, and decrement it when a completion message 200CT is received. If the count 130C reaches the predetermined limit, processor module 110 may instruct the transmission interface 130 to delay sending further non-posted messages 100NPT until count 130C drops below the limit. This approach may help prevent potential deadlock situations and ensure efficient utilization of the platform-level interconnect protocol's 30 resources.

Source device 100 may include a reception interface 140 that may receive completion messages 200CT as encapsulated data from destination device 200, tunneled via the platform-level interconnect protocol 30.

According to some embodiments, reception interface 140 may communicate the reception of completion messages 200CT to transmission interface 130 (e.g., either directly, or via processor 110) to control delay of transmission of non-posted messages 100NPT until count 130C drops below the limit, as explained above.

Additionally, or alternatively, reception interface 140 may collaborate with an extraction module 150 to extract relevant data 150DE from the completion messages 200CT. Extracted data 150DE may, for example, include a response 200RES to any previously sent request 200REQ.

The source device 100 may include a mechanisms to match response 200RES to a respective requests 200REQ. This matching process may be based on various forms of identification, such as headers, or metadata included in the completion messages 200CT.

For example, source device 100 may use transaction IDs, sequence numbers, or request tags that are preserved throughout the communication process. In some implementations, completion message 200CT may include a header field containing the original request ID, allowing the source device 100 to correlate the response with its corresponding request.

Additionally, or alternatively, source device 100 may maintain a lookup table or queue of outstanding requests, using timestamps or other unique identifiers to match incoming responses with their original requests. This matching process may ensure that even if responses are received out of order or from different completion messages, source device 100 would be able to accurately associate each response 200RES with its originating request 200REQ.

It may be appreciated that some transactions within system 10 may not require a response from the destination device 200. These transactions, which may be referred to as "fire-and-forget" operations, can be handled more efficiently by avoiding the overhead associated with non-posted messages and completion tracking. To accommodate such scenarios, source device 100 may be configured to handle these transactions differently.

For example, source device 100 may be configured to generate at least one access request that addresses the target destination device 200, but does not query data from the target destination device 200.

Additionally, or alternatively, source device 100 may receive at least one third-party request (e.g., request 200REQ' of computing device 20) that addresses the target destination device 200, and analyze that third-party request 200REQ' to determine that a response may not be required from the target destination device 200.

Source device 100 may subsequently employ encapsulation module 120 to encapsulate 120EN the at least one access request as payload, and tunnel the encapsulated access request 120EN to the target destination device 200 in a respective posted message 100PT, via the platform-level interconnect protocol 30.

Based on the determination that a response is indeed not required from target destination device 200, source device 100 may refrain from triggering a corresponding non-posted message 100NPT to the destination device 200 via the platform-level interconnect protocol 30. Additionally, source device 100 may control the at least one pro forma counter 130PC to refrain from incrementing.

Figure 5B:
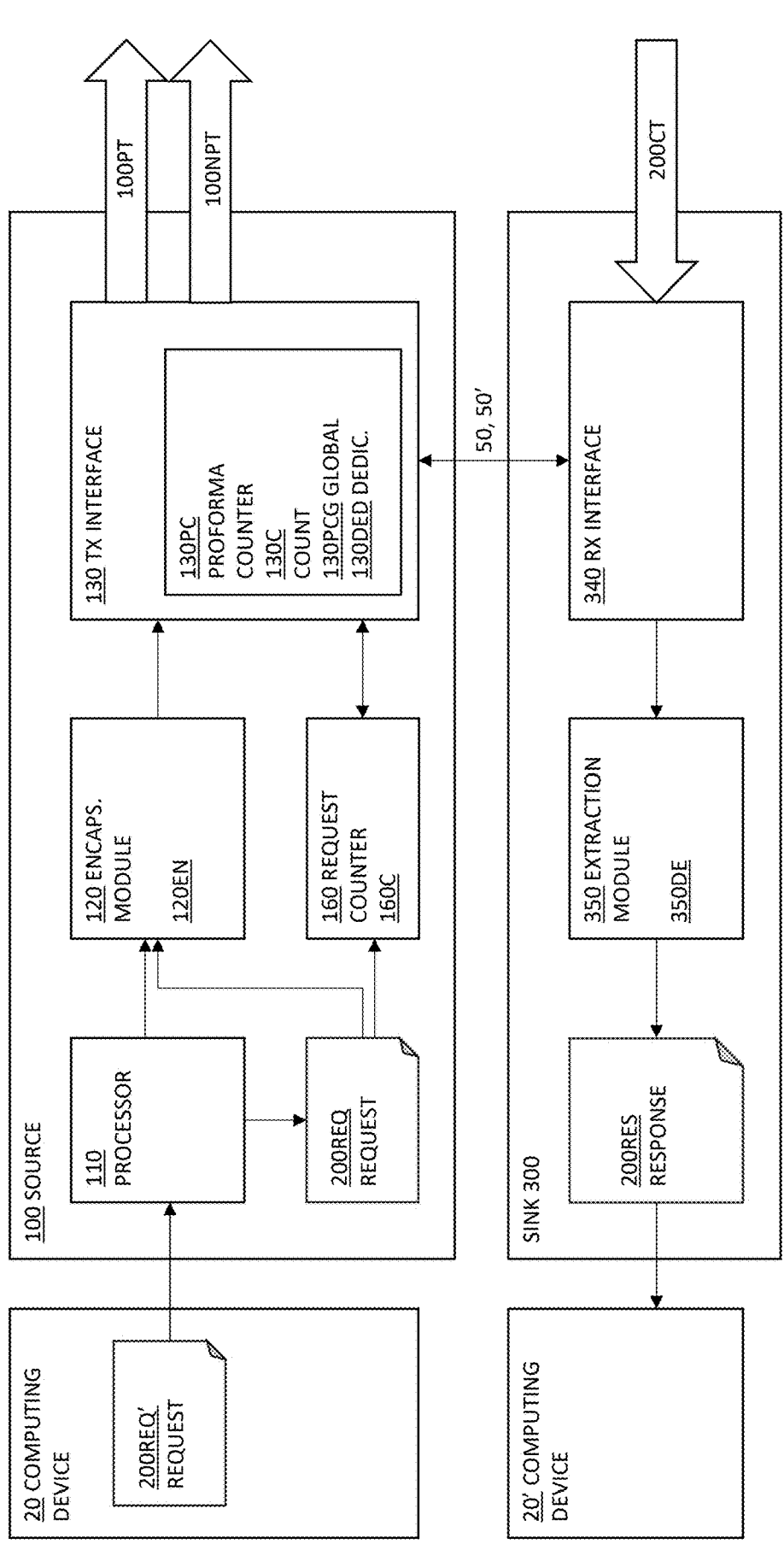
FIG. 5B illustrates a block diagram depicting a first configuration of a source device and a sink device that may be included in a data communication system, according to some embodiments of the invention.
Figure 5C:
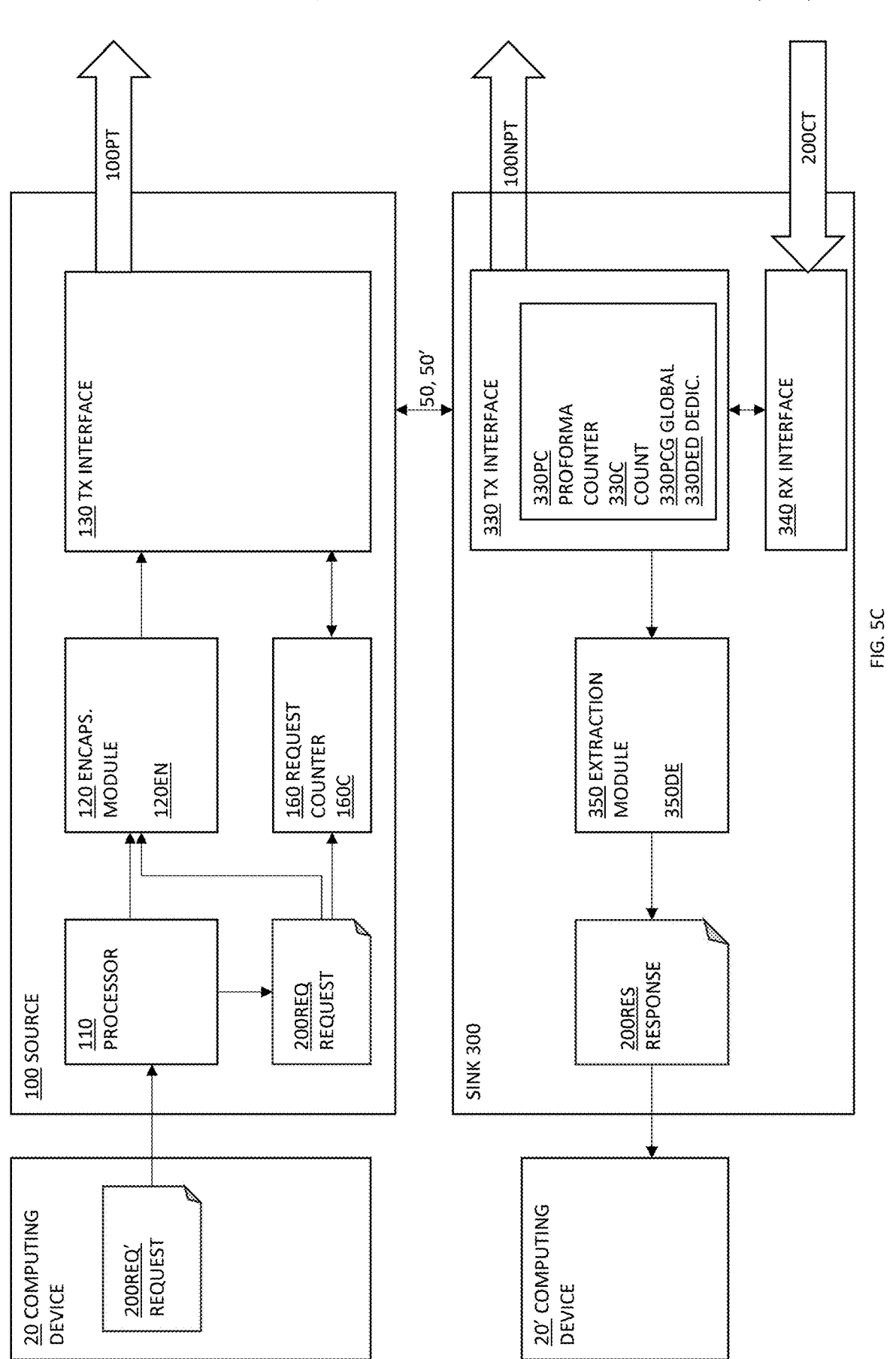
FIG. 5C illustrates a block diagram depicting another configuration of a source device and a sink device that may be included in a data communication system, according to some embodiments of the invention.

Reference is now made to FIGS. 5B and 5C which are block diagrams depicting examples for implementation of at least part of the system 10 for managing data communication. As shown in FIGS. 5B and 5C, system 10 may include the source device 100 and a sink device 300.

Elements of source device 100 in FIGS. 5B and 5C may be similar to those illustrated in FIG. 5A, and their description may not be fully repeated here for the sake of brevity.

The functionality of the source device 100 and the sink device 300 depicted in FIG. 5B may correspond to a work scenario as illustrated in FIG. 3B, in which the source device 100 may communicate data requests 200REQ to a destination device 200 of a group of destination devices 200′ as posted messages 100PT, followed by transmission of subsequent non-posted messages 100NPT. As explained herein, posted messages 100PT may designate a specific sink device 300 as a recipient of responses 200RES from the destination device 200, via completion messages 200CT.

As explained herein (e.g., in relation to FIG. 3B), source device 100 may further send notification 50 to the designated sink device 300. Notification 50 may include identification information for the specific request 200REQ, such as a transaction ID, sequence number, or a unique identifier. This identification may enable sink device 300 to correlate incoming responses 200RES with the original requests 200REQ when completion messages 200CT are received from destination device 200.

The functionality of the source device 100 and the sink device 300 depicted in FIG. 5C may correspond to a work scenario as illustrated in FIG. 3C. As in the scenario of FIGS. 3B and 5B, source device 100 may communicate data requests 200REQ to a destination device 200 of a group of destination devices 200′ as posted messages 100PT. Posted message 100PT may designate a specific sink device 300 as a recipient of responses from the destination device 200, via completion messages 200CT. Source device 100 may further communicate notification 50 to the designated sink device, thereby notifying sink 300 of the transmission of posted message 100PT. Unlike the scenario of FIGS. 3B and 5B, in FIG. 5C source 100 may refrain from transmitting non-posted message 100NPT to destination device 200. Instead, sink device 300 may transmit non-posted message 100NPT to destination device 200, e.g., subsequent to receiving notification 50 from source device 100.

In the example of FIG. 5B, source device 100 may be responsible for sending non-posted messages 100NPT. In such embodiments, source device 100 may incorporate functionality of pro forma counter 130PC. For example, transmission interface 130 may include at least one pro forma counter 130PC. The at least one pro forma counter 130PC may be, for example, a global pro forma counter 130PCG configured to maintain a count 130C of outstanding non-posted messages 100NPT sent by the source device 100 to the group of destination devices 200.

In other words, source device 100 may increment global pro forma counter 130PCG upon transmission of at least one (e.g., each) non-posted message 100NPT from source 100 to any destination device 200 of the group of destination device(s) 200, and decrement global pro forma counter 130PCG upon reception of each completion message from a destination device 200 of the group of destination device(s) 200.

Additionally, or alternatively, the pro forma counter 130PC may be, or may include one or more dedicated counters 130DED, dedicated to counting 130C specific outstanding non-posted messages 100NPT sent by source device 100 to specific destination devices 200.

In other words, source device 100 may increment dedicated pro forma counter 130DED upon transmission of at least one (e.g., each) non-posted message 100NPT from source 100 to a specifically targeted destination device 200, and decrement dedicated pro forma counter 130DED upon receiving each notification 50′ from sink device 300 of reception of a completion message 200CT from that target destination device 200.

Additionally, or alternatively, as depicted in the example of FIG. 5C, sink device 300 may be responsible for sending non-posted messages 100NPT. In such embodiments, a transmission interface 330 of the sink device may incorporate the functionality of a pro forma counter 330PC.

In such embodiments, pro forma counter 330PC may be adapted to maintain a count 330C of outstanding non-posted messages, in a similar manner to that of pro forma counter 130PC of FIG. 5A.

According to some embodiments, sink device 300 may receive completion messages 200CT from target destination device 200, over the platform-level interconnect protocol 30. As explained herein, completion messages 200CT may include encapsulated retrieved data. This encapsulated retrieved data may pertain to, e.g., be a response 200RES for specific data requests 200REQ.

As explained herein, completion message 200CT, which contains response 200RES to specific data request 200REQ may be associated with any one of the plurality of non-posted messages 100NPT (i.e., triggered by any one of posted messages 100PT), thereby avoiding one-to-one dependence, or correspondence between transmission of requests 200REQ, and reception of responses 200RES.

As shown in FIG. 5C, transmission interface 330 may include at least one pro forma counter 330PC. The at least one pro forma counter 330PC may be, for example, a global pro forma counter 330PCG configured to maintain a count 330C of outstanding non-posted messages 100NPT sent by sink device 300 to the group of destination devices 200.

In other words, sink device 300 may increment global pro forma counter 330PCG upon transmission of at least one (e.g., each) non-posted message 100NPT from sink 300 to any destination device 200 of the group of destination device(s) 200, and decrement global pro forma counter 330PCG upon reception of each completion message from a destination device 200 of the group of destination device(s) 200.

Additionally, or alternatively, the at least one pro forma counter 330PC may be, or may include one or more dedicated counters 330DED, dedicated to counting 330C specific outstanding non-posted messages 100NPT sent by sink device 300 to specific destination devices 200.

In other words, sink device 300 may increment dedicated pro forma counter 330DED upon transmission of at least one (e.g., each) non-posted message 100NPT from sink 300 to a specifically dedicated destination device 200, and decrement dedicated pro forma counter 330DED upon reception of each completion message from that dedicated destination device 200.

Additionally, or alternatively, source device 100 may be configured to notify 50 the designated sink device 300 of transmission of at least one posted message 100PT, targeting a specific destination device. Sink device 300 may subsequently increment the at least one pro forma counter 330PC (e.g., global pro forma counter 330PCG and/or dedicated counter 330DED) based on notification 50.

In some embodiments, system 10 may utilize virtual channels to further enhance communication efficiency and resource management. Pro forma counters 130PC/330PC may be extended to support specific virtual channels, allowing for more granular tracking and control of outstanding non-posted messages 100NPT within each virtual channel.

For example, dedicated pro forma counters 130DED/330DED may be assigned not only to monitor transmission of non-posted messages 100NPT between specific source/sink (100/300) devices and destination devices 200, but also to individual virtual channels within devices 100/200/300. This approach may enable source/sink (100/300) devices to maintain separate counts for different types of traffic or priority levels, even when communicating with the same destination device 200.

In other words, by incrementing and decrementing virtual, channel-specific pro forma counters 130PC/330PC, source/sink (100/300) device can manage traffic flow and resource allocation more precisely, providing fine-grained control over virtual channels of the platform-level interconnect protocol 30.

As shown in FIGS. 5B, 5C, reception interface 340 may collaborate with an extraction module 350 to extract relevant data 350DE from the completion messages 200CT. In this example, extracted data 350DE may be, or may include response data 200RES to any request 200REQ that was previously sent via posted message 100PT.

In some embodiments, completion message 200CT received by sink device 300 may be associated with any one of the plurality of non-posted messages 100NPT. This association may enable retrieval of the queried data while managing outstanding non-posted message limitations of the platform-level interconnect protocol 30. In such embodiments, reception interface 340 of sink device 300 may identify the extracted, encapsulated data 350DE of a completion message 200CT, originating from a first request 200REQ, as a response of the target destination device 200 to at least one specific, second request 200REQ.

For example, reception interface 340 may analyze metadata or headers within the completion message 200CT, which could include transaction IDs, sequence numbers, or request tags that are preserved throughout the communication process. In some embodiments, completion message 200CT may include a header field containing the original request ID, allowing the reception interface 340 to correlate a response 200RES with its corresponding request 200REQ.

Additionally, or alternatively, sink device 300 may maintain a lookup table or queue of outstanding requests, using timestamps or other unique identifiers to match incoming responses 200RES with their original requests 200REQ.

Additionally, or alternatively, sink device 300 may utilize identification information, embedded in notification 50, to associate between specific responses 200RES and their previously sent counterpart requests 200REQ.

In some embodiments, one or more (e.g., each) posted message 100PT may include an identification of a sink device 300 as a designated recipient of a response. Target destination device 200 may subsequently be configured to address the completion message 200CT to the sink device 300, via the platform-level interconnect protocol 30, based on this identification.

In such embodiments, source device 100 may be configured to identify the recipient sink device 300 for each posted message 100PT, and collaborate with the designated recipient sink device 300 to receive a notification 50' that includes an independent count 330C of outstanding non-posted messages 100NPT.

In some embodiments, source device 100 may compare the count 130C/330C of the at least one pro forma counter 130PC/330PC against a predetermined limit, and control the transmission interface to transmit the non-posted message based on that comparison.

In other words, source device 100 may identify a condition where the independent count 130C/330C pertaining to a specific destination device 200 has exceeded a predetermined threshold, and may perform mitigating actions, based on this identification. Source device 100 may thereby avoid exceeding a predetermined number of outstanding non-posted messages 100NPT between source/sink device (100/300) and one or more target destination device(s) 200.

This may be done, for example, by source device 100 delaying transmission of a posted request 100PT, thereby also delaying triggering of a subsequent non-posted request 100NPT. Additionally, or alternatively, this may be done by the sender of non-posted requests 100NPT (source device 100 in FIGS. 5A, 5B, or sink device 200 in FIG. 5C) delaying that transmission based on pro forma count (130C/330C) and/or request count 160C as explained herein, e.g., in relation to FIG. 6.

Figure 6:
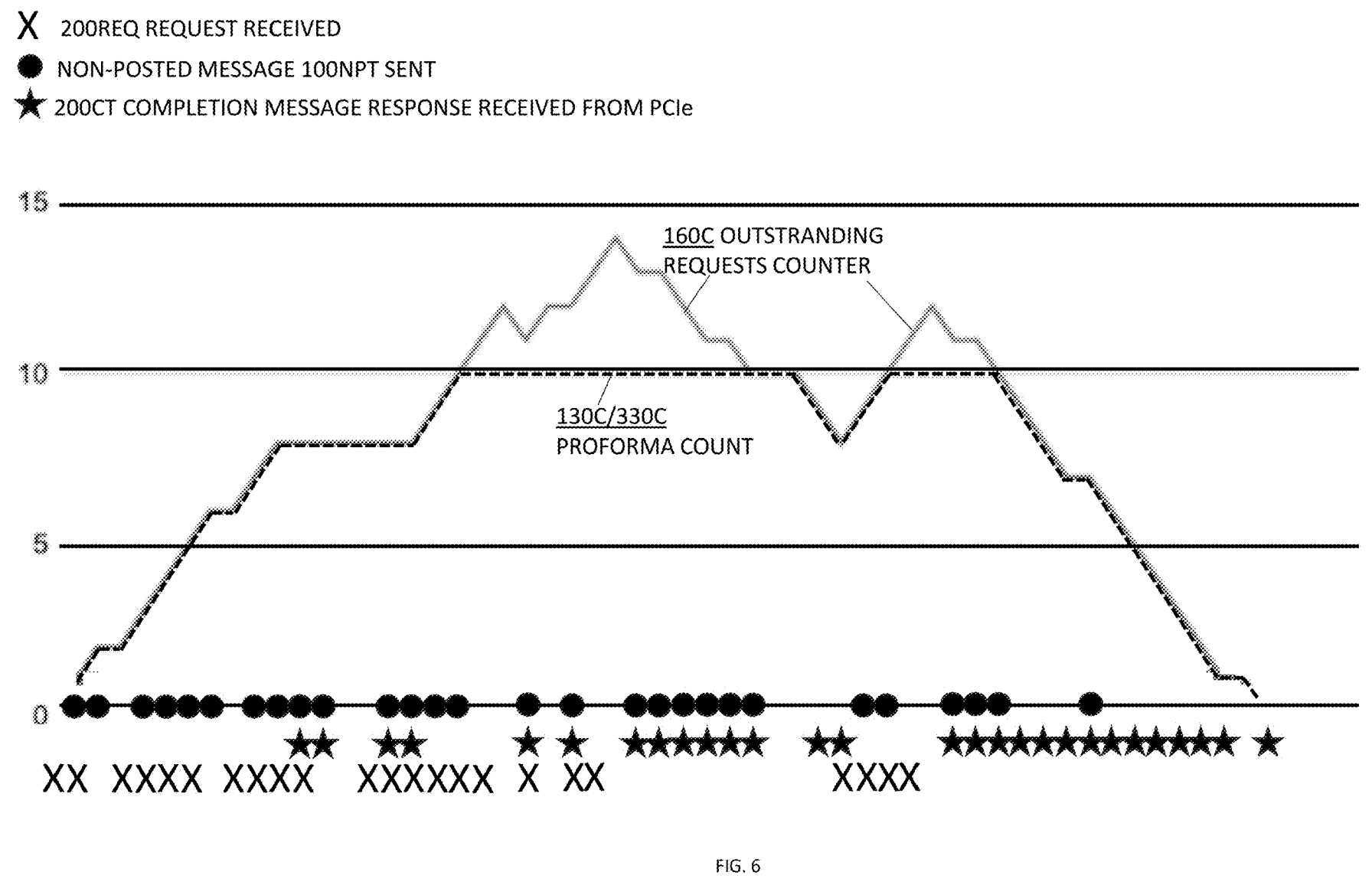

Reference is also made to FIG. 6, which is a schematic diagram showing an example of simulation of function of a data communication system, according to some embodiments of the invention. In this figure, X marks requests 200REQ received on source device 100, circles mark non-posted messages sent by source device 100 (e.g., as in FIGS. 5A, 5B) or sink device (FIG. 5C), and stars mark reception of completion messages 200CT on source device 100 (e.g., FIG. 5A) or sink device (FIGS. 5B, 5C). A Solid line marks the value of the outstanding requests count 160C, and a dashed line exhibits the pro forma count (130C on source 100 or 330C on sink 300).

As shown in FIG. 6, several processes take place in parallel, in each cycle (e.g., every clock count):

(a) The outstanding request value 160C may be updated as follows: New requests 200REQ, received from processor 110 or via an internal bus protocol trigger transmission of respective posted messages 100PT over the platform-level interconnect protocol 30 (e.g., PCIe), and may increment count 160C. Read completions 200CT (e.g., responses 200RES) received from the platform-level interconnect protocol 30 on reception interface 140/340 may decrement counter 160C.

(b) Pro forma outstanding counter value 130C/330C may be incremented when new read requests are sent as non-posted messages 100NPT over the platform-level interconnect protocol 30. Pro forma outstanding counter value 130C/330C may be decremented when read completions (e.g., responses 200RES) are received from the platform-level interconnect protocol 30 on reception interface 140/340.

(c) A read request may be sent by TX interface 130/330 as a non-posted message 100NPT, to solicit a completion message 200CT which may be used to carry data resulting from the actions of posted message 100PT at target destination device 200. TX interface 130/330 may transmit non-posted message 100NPT provided at least one (e.g., both) of the following conditions are met: (c.1.) The number of outstanding pro forma 130C/330C will not exceed a maximal predefined threshold, and (c.2.) a new request 200REQ has been received, or the outstanding pro forma count 130C/330C of a previous clock cycle was less than outstanding request count 160C in the previous clock cycle.

In other words, the sender (100/300) of non-posted requests 100NPT may keep track of the number of delayed (e.g. still unsent) non-posted requests 100NPT, and manage their transmission, based on the number 130C/330C of outstanding non-posted requests 100NPT and/or a count of pending requests 200REQ or sent posted requests 100PT. The use of these counters by the sender (source device 100/sink device 300) to keep track of non-posted requests that have been delayed allows it to send delayed non-posted requests 100NPT once the predetermined number of outstanding non-posted messages does not exceed a threshold.

Pertaining to the examples of FIGS. 5A and 5B, source device 100 may periodically poll a count value 130C (in the scenario of FIG. 5A), and/or request count value 330C from sink device 300 (in the scenario of FIG. 5B), from dedicated counters 130DED/330DED of one or more (e.g., each) destination device 200, and compare count values 130C/330C to the predetermined threshold and/or count 160C. When this threshold is exceeded, source device 100 may perform mitigating actions, such as redirecting a request from a first destination device to a second destination device of the group of destination devices, delaying transmission of messages 100NPT to target destination devices 200, or refraining from transmitting messages 100NPT altogether, until count values 130C/330C recedes below the threshold.

In another example, source device 100 may monitor count values 130C/330C asynchronously. For example, sink device 300 may be configured to send a notification 50' to source device 100 when count value 330C for any destination device reaches or exceeds the threshold, enabling source device 100 to perform the above-mentioned mitigating actions.

In another example, source device 100 (e.g., processor 110) may track the rate of change of count value 130C/330C and/or pending requests count 160C over time, to perform predictive analysis of the number of outstanding, unanswered non-posted messages 100NPT. When source device 100 (e.g., processor 110) predicts that count 130C/330C will exceed the threshold for a destination device within a certain timeframe, it may preemptively perform the above-mentioned mitigating actions. Other such examples are also possible.

Figure 7:
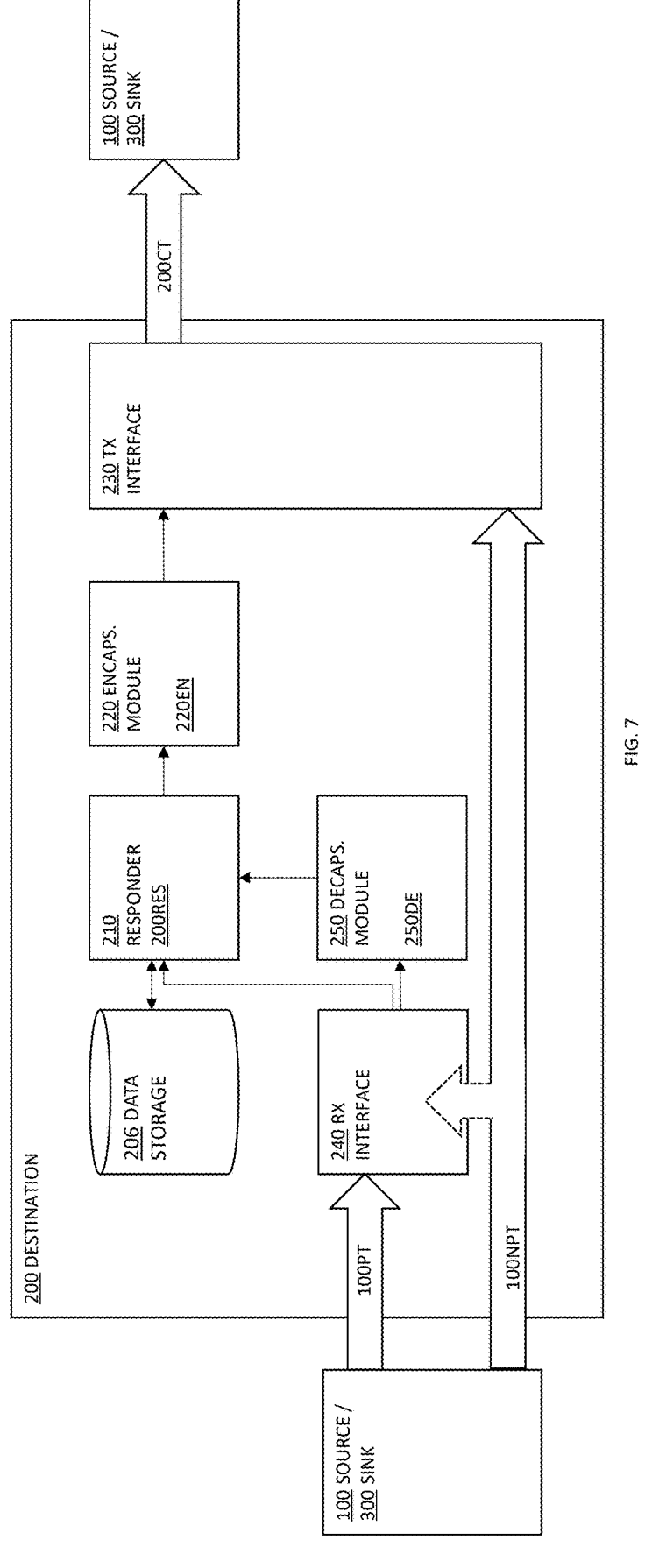
FIG. 7 illustrates a block diagram depicting a destination device that may be included in a data communication system, according to some embodiments of the invention.

Reference is now made to FIG. 7 which is a block diagram depicting a destination device 200 for managing data communication according to some embodiments of the invention. Destination device 200 may be the same as destination device 200 of FIGS. 3A and 3B.

As shown in FIG. 7, destination device 200 may include a reception interface 240, an extraction module 250, a responder (e.g., a processing unit, a memory element) 210, an encapsulation module 220, and a transmission interface 230. Destination device 200 may also include, or be communicatively connected to a data storage 206, such as storage device 6 of FIG. 1.

According to some embodiments, encapsulation module 220, reception interface 240 and extraction module 250 may be similar to their counterpart modules (elements 120, 140, 150 of source device 100), as elaborated herein (e.g., in relation to FIG. 5A), and will not be fully repeated here for the purpose of brevity.

Reception interface 240 may be configured to receive encapsulated requests 120EN, e.g., encapsulated versions of a first and second request 200REQ, as payload from a source device 100 via respective first and second posted messages 100PT transmitted via the platform-level interconnect protocol 30.

Reception interface 240 may also receive a first non-posted message 100NPT and a second non-posted message 100NPT from the source device 100 via the platform-level interconnect protocol 30, respectively triggered by the first and second first and second posted messages 100PT.

Extraction module 250 may extract the first request from the encapsulated payload 120EN received via the posted messages 100PT, to generate extracted data 250DE (e.g., an extracted request 200REQ).

Responder (e.g., processing unit, memory element) 210 may be adapted to generate a response based on the extracted first request 200REQ. For example, the first request 200REQ may include a query of data from destination device 200, e.g., from data storage 206. Responder 210 may access the data storage 206 to retrieve or process the queried data as a response 200RES to the extracted first request 200REQ.

Encapsulation module 220 may subsequently encapsulate the queried data (e.g., response 200RES) as payload in an appropriate format, to accommodate the format of the platform-level interconnect protocol 30.

The transmission interface 230 may be configured to tunnel response 200RES to a source device 100 or sink device 300 via the platform-level interconnect protocol 30 in a completion message 200CT. As explained herein, the completion message 200CT which includes response 200RES may be associated with any one of the first and second posted messages 100PT. In other words, completion message 200CT may be associated with either one of the first and second non-posted messages 100NPT, which were respectively triggered by the first and second posted requests 100PT. For example, response 200RES to the first request 200REQ may be associated with the second non-posted message 100NPT, thereby severing the on-to-one correlation between requests 200REQ and their corresponding responses 200RES.

One example of why it may be beneficial for responder 210 to associate the first completion message 200CT with the second non-posted messages 100NPT could be the case where, due to caching or similar mechanism, the second posted request 100PT became available earlier than the response to the first posted request 100PT, and where due to a limit on the number of outstanding non-posted messages, second non-posted message 100NPT had not yet been received by responder 210. In this example, responder 210 (e.g., a processing unit, a memory element) may have chosen to use the completion to the non-posted request triggered by first request 200REQ to convey the response data for second posted request 100PT, and later choose to use the completion for the non-posted request triggered by second request 200REQ to convey the response data for second posted request 100PT.

According to some embodiments, non-posted message 100NPT may be regarded as solicitation for any response by destination 200. Non-posted messages 100NPT may therefore bypass decapsulation, responder and encapsulation modules (210, 220, 250), and be directed to TX interface 230 to generate a completion message 200CT that includes any response 200RES to any previously received posted message 100PT.

Additionally, or alternatively, non-posted message 100NPT may (or may not) include internal bus protocol 20P metadata, such as packet endianness, encapsulated and tunneled over the platform-level interconnect protocol 30. In such embodiments, non-posted message 100NPT may be transferred via decapsulation, responder and encapsulation modules (210, 220, 250) en route TX interface 230, to produce response completion message 200CT as a conduit for response 200RES.

As explained herein (in relation to FIGS. 5A and 5B), the recipient of response 200RES, e.g., source device 100 and/or sink device 300 may be configured to identify response 200RES in the completion message 200CT (now elements 200RES/200RES respectively), as an answer for a specific request 200REQ.

For example, source device 100 may associate response 200RES (now 200RES), which was received via completion message 200CT as a response to the second non-posted message 100NPT as pertaining to the first data request 200REQ.

In another example, sink device 300 may associate response 200RES (now 200RES), which was received via completion message 200CT as a response to the first non-posted message 100NPT as pertaining to the second data request 200REQ.

As explained herein, the roles of source device 100, destination device 200 and sink device 300 may switch as part of the workflow of system 10. For example, destination device 200 may also be configured to function as a source device 100, adapted to generate requests 200REQ, while source device 100 may be configured to function as a destination device 200, adapted to tunnel encapsulated response data 200RES via the platform-level interconnect protocol 30 in completion messages 200CT, as elaborated herein.

Figure 8A:
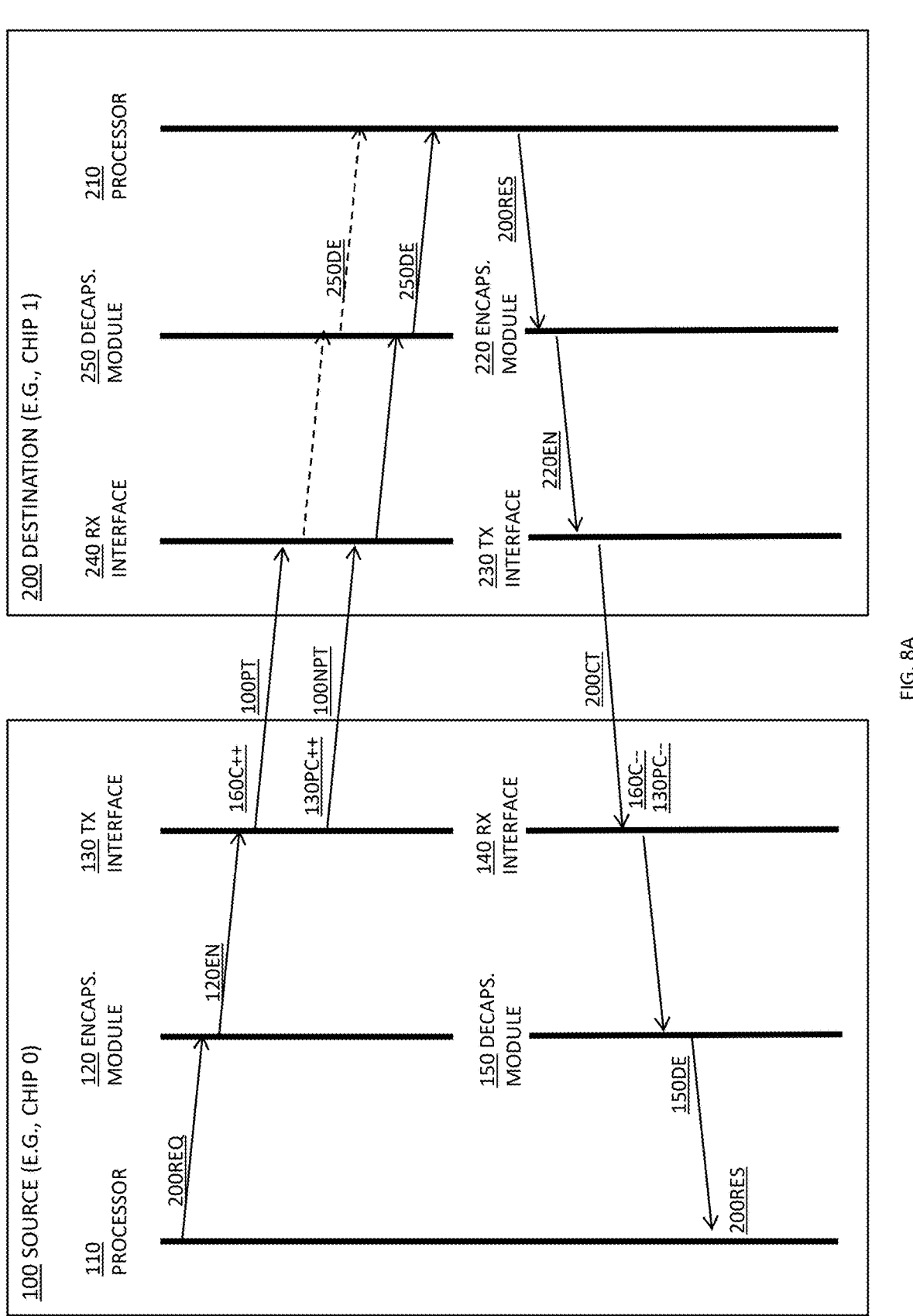
FIGS. 8A, 8B and 8C are sequence diagrams, showing the flow of data among, and within members of the data communication system, according to some embodiments of the invention.

Reference is now made to FIG. 8A which is a sequence diagram depicting interactions between the source device 100 and the destination device 200 in data communication system 10 according to some embodiments of the invention. The sequence diagram of FIG. 8A may correspond to the scenario of FIGS. 3A and 5A, as elaborated herein.

FIG. 8A shows a flow of signals and data processing operations that occur during the tunnelling of requests and responses via the platform-level interconnect protocol 30. Processor module 110 of source device 100 may receive or generate a request signal 200REQ that may represent a data query or command directed toward destination device 200. This request signal 200REQ may originate from computational processes executing within the processor module 110, such as applications requiring data retrieval or processing services from remote devices. Request signal 200REQ may contain information specifying the type of operation to be performed, target addresses, and other parameters needed for proper request handling.

Encapsulation module 120 may receive the request signal 200REQ and process the signal to generate encapsulated data 120EN. The encapsulated data 120EN may include meta-data such as fine-grained traffic identification and priority information that may allow transaction identification and tracking capabilities. Additionally, or alternatively, encapsulated data 120EN may include meta-data that enables complex multi-step operations to be transmitted as single units. Furthermore, encapsulated data 120EN may include meta-data to handle endianness coding, facilitating communication between devices with different byte ordering conventions. The encapsulation process may transform the internal bus protocol data 20P into a format suitable for transmission over the platform-level interconnect protocol 30.

As shown in FIG. 8A, transmission interface 130 may process the encapsulated data 120EN and generate multiple control signals and messages. For example, transmission interface 130 may increment request counter 160C, indicating increase in the number of requests 20REQ awaiting completion, thereby tracking outgoing requests for accounting and flow control purposes.

The transmission interface 130 may transmit a posted message 100PT containing the encapsulated request data 120EN to at least one destination device 200 of a group of destination devices 200', followed by a non-posted message 100NPT that serves as a mechanism for receiving completion responses.

The transmission interface 130 may subsequently generate a pro forma counter increment 130PC++ to manage the count of outstanding non-posted messages 100NPT.

Destination device 200 may receive both the posted message 100PT and the non-posted message 100NPT through the reception interface 240. The reception interface 240 may forward these messages to the extraction module 250, which may process the received data to generate extracted data 250DE.

Extracted data 250DE may contain the original request information 200REQ that was encapsulated by the source device 100, including any meta-data fields and protocol-specific information. Responder 210 of the destination device 200 may analyze the extracted data 250DE and perform the requested operations, such as data retrieval from the data storage (e.g., data storage 206 of FIG. 7) or another computational processing action.

Upon completing the requested operation, responder 210 may generate response data 200RES that addresses the original request signal 200REQ.

Encapsulation module 220 of the destination device 200 may receive the response data 200RES from responder 210 and generate encapsulated data 220EN containing the response information. The transmission interface 230 may process the encapsulated data 220EN and generate a response signal 200RES that represents the completion of the requested operation. Transmission interface 230 may transmit response signal 200RES back to the source device 100 as a completion message 200CT via the platform-level interconnect protocol 30.

The completion message 200CT may be associated with the non-posted message 100NPT that was previously sent by the source device 100, establishing the communication channel for the response data.

A reception interface 140 of source device 100 may receive completion message 200CT and process the incoming response data. Reception interface 140 may further generate control signals to decrement request counter 160C and pro forma counter 130PC, thus tracking counters maintained by the source device 100. The request counter decrement 160C—may indicate that a previously sent request has received a response in a respective completion message 200CT, while the pro forma counter decrement 130PC—may indicate that an outstanding non-posted message has been completed.

An extraction module 150 of the source device 100 may process the completion message 200CT, e.g., decapsulating 200CT to generate extracted data 150DE, which may contain the response information 200RES that addresses the original request signal 200REQ.

Figure 8B:
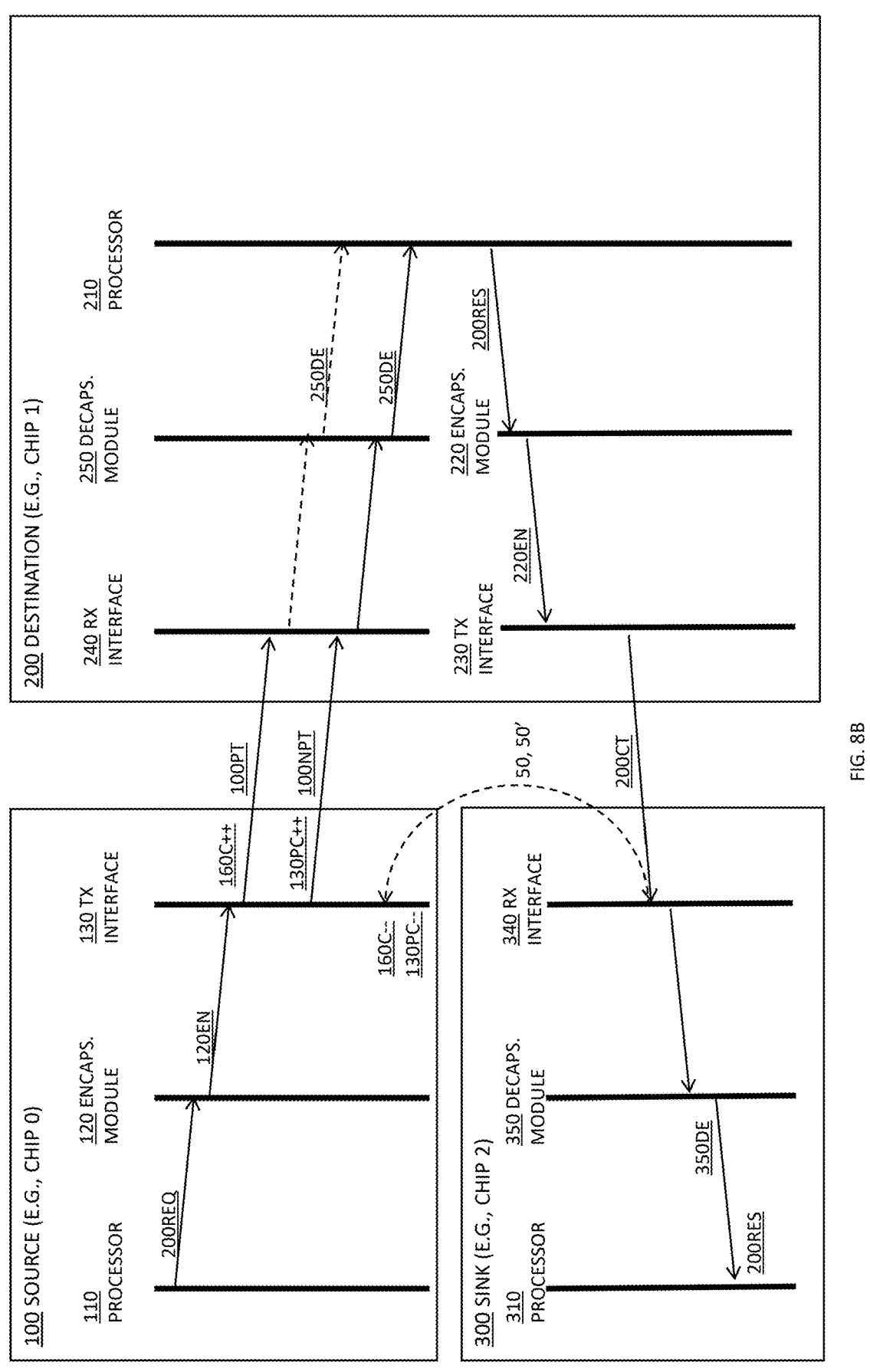

FIG. 8B depicts a sequence diagram illustrating interactions between the source device 100, the destination device 200, and the sink device 300 in a more complex communication scenario, corresponding to the scenario of FIGS. 3B and 5B, discussed above.

The sequence begins similarly to FIG. 8A, with the processor module 110 generating request 200REQ and the encapsulation module 120 producing the encapsulated data 120EN. Transmission interface 130 may increment request counter 160C and the pro forma counter 130PC while transmitting the posted message 100PT to the destination device 200, followed by a subsequent non-posted message 100NPT.

As explained herein, source device 100 may include a designation of a specific sink device 300 in posted message 100PT. For example, source device 100 may designate the specific sink device 300 as a recipient of data, e.g., a user, or processor of that data, from destination device 200. Source 100 may further transmit a notification 50 the designated sink device, notifying it of the transmitted posted message 100PT and/or request 200REQ included therein.

Destination device 200 may process these messages through reception interface 240, extraction module 250, and responder 210, generating response data 200RES that may be encapsulated by the encapsulation module 220, as elaborated herein (e.g., in relation to FIG. 8A).

As shown in FIG. 8B, transmission interface 230 of the destination device 200 may direct response 200RES as a completion message 200CT to the designated sink device 300, which may be a separate entity from the source device 100.

A reception interface 340 of designated sink device 300 may receive completion message 200CT. The sink device 300 may include the extraction module 150 that processes the completion message 200CT to generate the extracted data 150DE containing the response information 200RES. This configuration may allow for distributed processing architectures where request origination and response handling may be performed by different devices within the system 10.

Sink device 300 may send notifications 50' to the originator source device 100, indicating (i) reception of completion message 200CT and/or (ii) handling of response 200RES. Source device 100 may respectively decrement request counter 160C and pro forma counter 130PC. The request counter decrement 160C may indicate that a response 200RES for a previously sent request 200REQ has been handled, while the pro forma counter decrement 130PC may indicate that an outstanding non-posted message 100NPT has been completed.

Figure 8C:
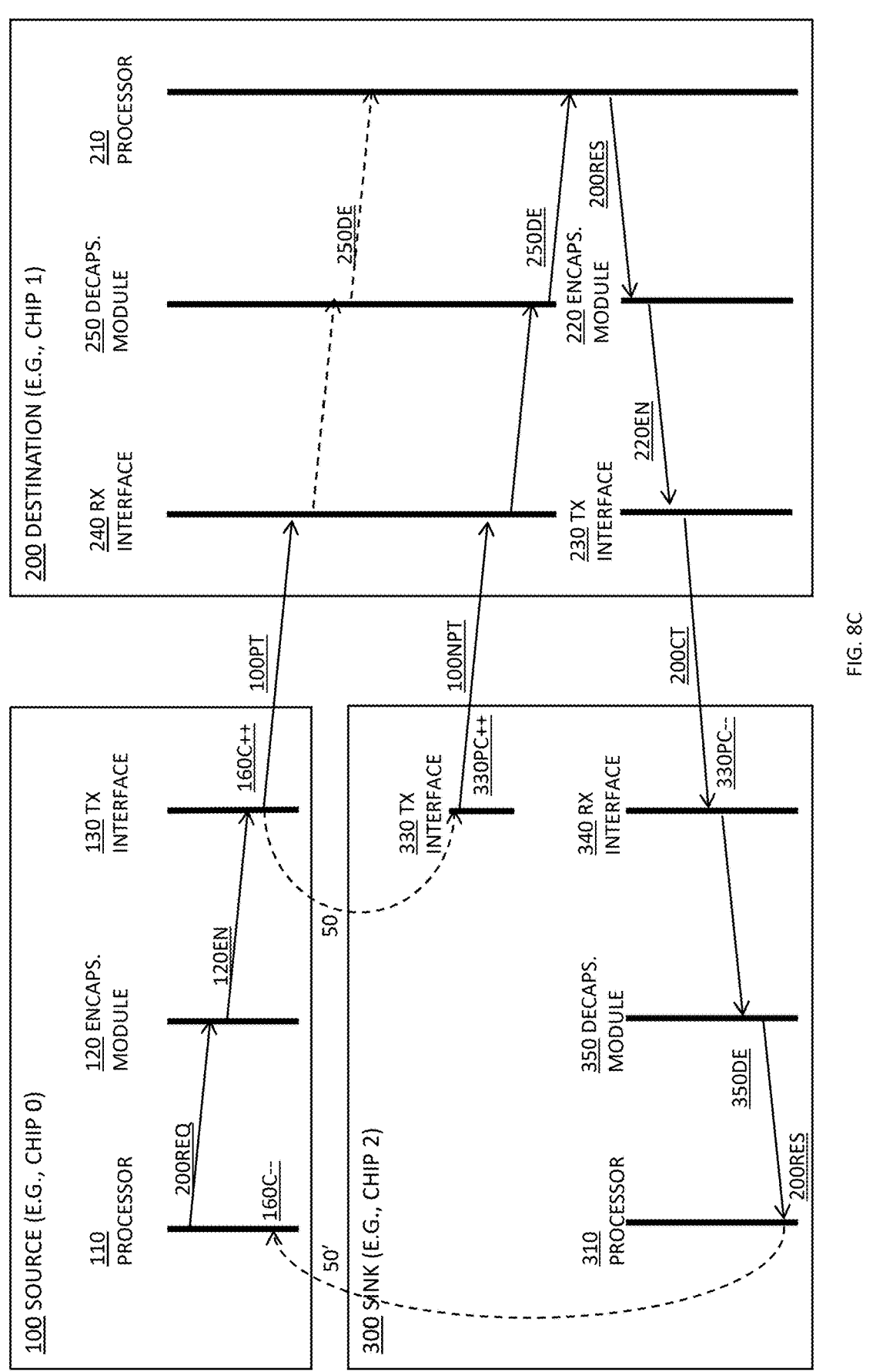

FIG. 8C illustrates another sequence diagram showing interactions between the source device 100, the destination device 200, and the sink device 300, with additional counter management operations. The sequence may begin in a similar manner to that of FIG. 8B: Processor module 110 may generate request 200REQ, which may be processed by the encapsulation module 120 to produce the encapsulated data 120EN. Transmission interface 130 may increment request counter 160C and transmit posted message 100PT to destination device 200.

Unlike the scenario of FIGS. 5B and 7B, sink device 300 of FIGS. 5C and 8C may include a pro forma counter 330PC that tracks outstanding non-posted messages. In the example of FIG. 8C, sink device 300 may receive a notification 50 from source device 100, notifying it of transmission of posted message 100PT. Notification 50 may trigger sink device 300 to transmit non-posted message 100NPT, and increment its local pro forma counter 330. Sink 300 may thus keep track of the count 330C of outstanding non posted messages 100NPT.

Destination device 200 may process these messages through the reception interface 240, the extraction module 250, and responder 210, and generating response data 220EN for encapsulation by its encapsulation module 220. The transmission interface 230 of the destination device 200 may send the response signal 200RES to the sink device 300 as the completion message 200CT. The reception interface 340 of the sink device 300 may receive the completion message 200CT and collaborate with the extraction module 350 to generate the extracted data 350DE.

Sink device 300 may decrement pro forma counter 330PC may be decremented when completion messages are received, maintaining accurate tracking of outstanding transactions between the source device 100 and the destination device 200.

Sink device 300 may also notify 50' source device 100 of the received response 200RES, allowing it to decrement the number 160C of outstanding requests, as shown for example, in the simulation depicted in FIG. 6.

It may be appreciated that embodiments of the invention may require a unique hardware configuration high speed computing, to obtain efficient communication between source 100, destination 200 and sink devices 300, e.g., for obtaining responses 200RES to data requests with high traffic, in real time, while overcoming restrictions of platform-level interconnect protocols. This type of computing is not feasible, e.g., by a human mind:

The computational complexity involved in managing the decoupling of requests and responses across multiple devices requires rapid processing capabilities. For instance, tracking thousands of outstanding non-posted messages across multiple virtual channels, maintaining accurate pro forma counters for numerous destination devices, and dynamically associating completion messages 200CT with available non-posted message slots 100NPT demands microsecond-level decision making. The system must simultaneously monitor traffic patterns, predict bottlenecks, and redistribute requests across different destination devices while maintaining data integrity and protocol compliance. Such real-time optimization of communication flows, involving complex algorithms for load balancing and resource allocation, necessitates automated processing systems capable of handling massive parallel operations.

Furthermore, the invention's ability to manage platform-level interconnect protocol limitations through intelligent message routing and association requires continuous analysis of system performance metrics and instantaneous adjustments to communication strategies. The processing overhead associated with encapsulation and tunneling of intramodule protocol data within platform-level interconnect protocols 30, combined with the need to maintain quality of service across multiple virtual channels and priority levels, creates computational demands that far exceed human processing capabilities.

Unless explicitly stated, the method embodiments described herein are not constrained to a particular order or sequence. Furthermore, all formulas described herein are intended as examples only and other or different formulas may be used. Additionally, some of the described method embodiments or elements thereof may occur or be performed at the same point in time.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A method of managing data communication by at least one processor, the method comprising:
    receiving a first request and a second request from a source device, each request querying data from a destination device;
    encapsulating each of the first and second requests as payload and tunnelling the encapsulated requests from the source device to the destination device as respective first and second posted messages via a platform-level interconnect protocol;

transmitting a first non-posted message and a second non-posted message to the destination device via the platform-level interconnect protocol, wherein the first and second non-posted messages are respectively triggered by the first and second posted messages;

obtaining the queried data pertaining to the first request from the destination device; and encapsulating the queried data as payload and tunnelling the encapsulated queried data from the destination device to a sink device via the platform-level interconnect protocol as a completion message, associated with the second non-posted message, thereby enabling retrieval of the queried data while managing outstanding non-posted message limitations of the platform-level interconnect protocol.

2. The method of claim 1, wherein the platform-level interconnect protocol is PCIe (Peripheral Component Interconnect Express).

3. The method of claim 1 further comprising delaying the transmission of at least one non-posted message, pending reception of at least one completion message from the destination device, thus avoiding exceeding a predetermined number of outstanding non-posted messages between the source device and the destination device.

4. The method of claim 1, wherein the destination device is further configured to function as a source device, adapted to emit said requests, and wherein the source device is further configured to function as a destination device, adapted to tunnel encapsulated data via the platform-level interconnect protocol in a completion message.

5. A system for data tunnelling, comprising a source device and a sink device, wherein the source device comprises:

a processor configured to generate a plurality of requests, addressing a target destination device of a group of destination devices;

an encapsulation module configured to encapsulate each of the requests as payload; and a transmission interface configured to:

tunnel the encapsulated requests to the target destination device by transmitting a respective plurality of posted messages via a platform-level interconnect protocol; and transmit a plurality of non-posted messages to the target destination device via the platform-level interconnect protocol, wherein each non-posted message is triggered by a respective posted message of the plurality of posted messages, and wherein the sink device comprises a reception interface configured to receive encapsulated retrieved data, pertaining to a specific request of the plurality of requests, from the target destination device via the platform-level interconnect protocol as a completion message, and wherein said completion message is associated with any one of the plurality of non-posted messages.

6. The system of claim 5, wherein the source device and the sink device are implemented as the same device.

7. The system of claim 5, wherein the reception interface of said sink device is further configured to identify encapsulated retrieved data, of a completion message originating from a first request, as a response of the target destination device to at least one second request.

8. The system of claim 5 wherein the processor of the source device is further configured to delay transmission of at least one non-posted message, pending reception of at least one completion message from the target destination device, thereby avoiding exceeding of a predetermined number of outstanding non-posted messages between the source device and the target destination device.

9. The system of claim 5 further comprising at least request counter configured to (a) increment upon reception of a request, and (b) decrement upon reception of at least one completion message, wherein the processor of the source device is further configured to delay transmission of at least one non-posted message based on a value of said request counter.

10. The system of claim 5 further comprising at least one pro forma counter configured to (a) increment upon transmission of at least one non-posted message, and (b) decrement upon reception of at least one completion message.

11. The system of claim 5 wherein the source device is configured to transmit said posted, and non-posted messages to a plurality of target destination devices of said group of destination devices via at least one connection fabric device.

12. The source device of claim 10, wherein the processor is further configured to:

compare the at least one pro forma counter against a predetermined limit; and control the transmission interface to transmit the non-posted message based on said comparison.

13. The system of claim 10, wherein the source device is further configured to:

generate at least one access request that addresses the target destination device, but does not query data from the target destination device;

encapsulate the at least one access request as payload;

tunnel the encapsulated access request to the target destination device in a respective posted message via the platform-level interconnect protocol;

refrain from triggering a corresponding non-posted message to the destination device via the platform-level interconnect protocol; and control the at least one pro forma counter to refrain from incrementing.

14. The system of claim 10, wherein the source device is further configured to:

receive at least one third-party request that addresses the target destination device;

analyze said third-party request, to determine whether a response is required from the target destination device;

encapsulate the at least one third party request as payload;

tunnel the encapsulated at least one third party request to the target destination device in a respective posted message via the platform-level interconnect protocol;

based on said analysis, refrain from triggering a corresponding non-posted message to the destination device via the platform-level interconnect protocol; and based on said analysis, control the at least one pro forma counter to refrain from incrementing.

15. The system of claim 10, wherein the at least one pro forma counter is implemented on the sink device, wherein the source device is configured to notify the sink device of transmission of at least one non-posted message, and wherein the sink device is configured to increment the at least one pro forma counter based on said notification.

16. The system of claim 10 wherein the at least one pro forma counter comprises:

a global pro forma counter, tracking an overall number of outstanding non-posted messages, sent to the group of destination devices; and one or more dedicated pro forma counters, each tracking a number of outstanding non-posted messages, sent to a specific destination device of the group of destination devices.

17. The system of claim 16, wherein the source device is configured to:

identify the recipient sink device for each posted message;

collaborate with the recipient sink device to maintain an independent count of outstanding non-posted messages.

18. The system of claim 17, wherein the source device is further configured to:

identify a condition where the independent count pertaining to a first destination device has exceeded a predetermined threshold; and redirecting a request from the first destination device to a second destination device of the group of destination devices, based on said identification.

19. A destination device for managing data communication, the destination device comprising:

a reception interface configured to:

receive encapsulated first and second requests as payload from a source device via respective first and second posted messages transmitted through the platform-level interconnect protocol; and receive a first non-posted message and a second non-posted message from the source device via a platform-level interconnect protocol, wherein the first and second non-posted messages are respectively triggered by with the first and second posted messages;

an extraction module configured to extract the first request;

a processor adapted to generate a response based on the extracted first request; and a transmission interface configured to tunnel the response to a sink device via the platform-level interconnect protocol in a completion message associated with the second non-posted messages, wherein the sink device is configured to identify the response, in the completion message associated with the second non-posted message as pertaining to the first data request.

20. The destination device of claim 19 wherein the first request comprises a query of data from the destination device, and wherein said processor is configured to obtain queried data based on the first data request; and encapsulate the queried data as payload, to be sent via a completion message associated with either one of the first and second non-posted messages.

* * * * *